United States Patent
Ohkawara

(10) Patent No.: US 6,930,720 B2
(45) Date of Patent: Aug. 16, 2005

(54) VIDEO CAMERA SYSTEM WITH INTERCHANGEABLE LENS ASSEMBLY

(75) Inventor: Hiroto Ohkawara, Toride (JP)

(73) Assignee: Canon Kabushiki Kaisha, Tokyo (JP)

( * ) Notice: Subject to any disclaimer, the term of this patent is extended or adjusted under 35 U.S.C. 154(b) by 669 days.

(21) Appl. No.: 10/132,524

(22) Filed: Apr. 26, 2002

(65) Prior Publication Data

US 2002/0154241 A1 Oct. 24, 2002

Related U.S. Application Data

(62) Division of application No. 08/712,161, filed on Sep. 11, 1996, now Pat. No. 6,396,540.

(30) Foreign Application Priority Data

Sep. 20, 1995 (JP) .............................. 7-241589
Sep. 22, 1995 (JP) .............................. 7-244496

(51) Int. Cl.[7] ......................... H04N 5/232; H04N 5/222
(52) U.S. Cl. ................................... 348/345; 348/333.03
(58) Field of Search ................................ 348/350, 353, 348/354, 355, 356, 345, 360, 335, 333.03; 396/51, 529, 531, 532

(56) References Cited

U.S. PATENT DOCUMENTS

| | | | | |
|---|---|---|---|---|
| 4,404,595 A | | 9/1983 | Ushiro et al. | 358/227 |
| 5,031,049 A | | 7/1991 | Toyama et al. | 358/227 |
| 5,036,399 A | * | 7/1991 | Mabuchi | 348/356 |
| 5,038,163 A | | 8/1991 | Hirasawa | 396/81 |
| 5,051,833 A | | 9/1991 | Tsuji | 358/227 |
| 5,257,058 A | * | 10/1993 | Mabuchi | 348/356 |
| 5,387,960 A | | 2/1995 | Hirasawa et al. | 354/402 |
| 5,402,174 A | | 3/1995 | Takahashi | 348/345 |
| 5,457,512 A | | 10/1995 | Kondo | 354/400 |
| 5,485,208 A | | 1/1996 | Mabuchi et al. | 348/335 |
| 5,485,241 A | | 1/1996 | Irie et al. | 396/51 |
| 5,541,655 A | | 7/1996 | Kaneda | 348/333 |
| 5,543,887 A | | 8/1996 | Akashi | 354/51 |
| 5,570,156 A | | 10/1996 | Arai | 396/51 |
| 5,604,537 A | | 2/1997 | Yamazaki et al. | 348/350 |
| 5,634,141 A | | 5/1997 | Akashi et al. | 348/335 |
| 6,373,524 B2 | * | 4/2002 | Suda et al. | 348/345 |
| 6,507,367 B2 | * | 1/2003 | Yasuda | 348/355 |
| 6,731,339 B2 | * | 5/2004 | Ohkawara | 348/354 |
| 2002/0075395 A1 | * | 6/2002 | Ohkawara | 348/360 |

FOREIGN PATENT DOCUMENTS

JP 05-328197 4/1992 .......... H04N/5/232

* cited by examiner

Primary Examiner—Aung Moe
(74) Attorney, Agent, or Firm—Morgan & Finnegan, LLP

(57) ABSTRACT

A video camera system having a camera (128) and an interchangeable lens assembly (127) attachable to and detachable from the camera. A distance measurement frame is set by a distance measurement frame controller (129) on photographer's line-of-sight position information detected by line-of-sight detecting units (135 to 140), and a focal-point evaluation value is extracted by an AF signal processing circuit (113) from an image signal corresponding to the distance measurement frame. The line-of-sight position information, focal-length evaluation value, etc, are transmitted to the lens assembly (127). A zoom lens (102) and focusing lens (105) are controlled by the lens assembly (127).

13 Claims, 12 Drawing Sheets

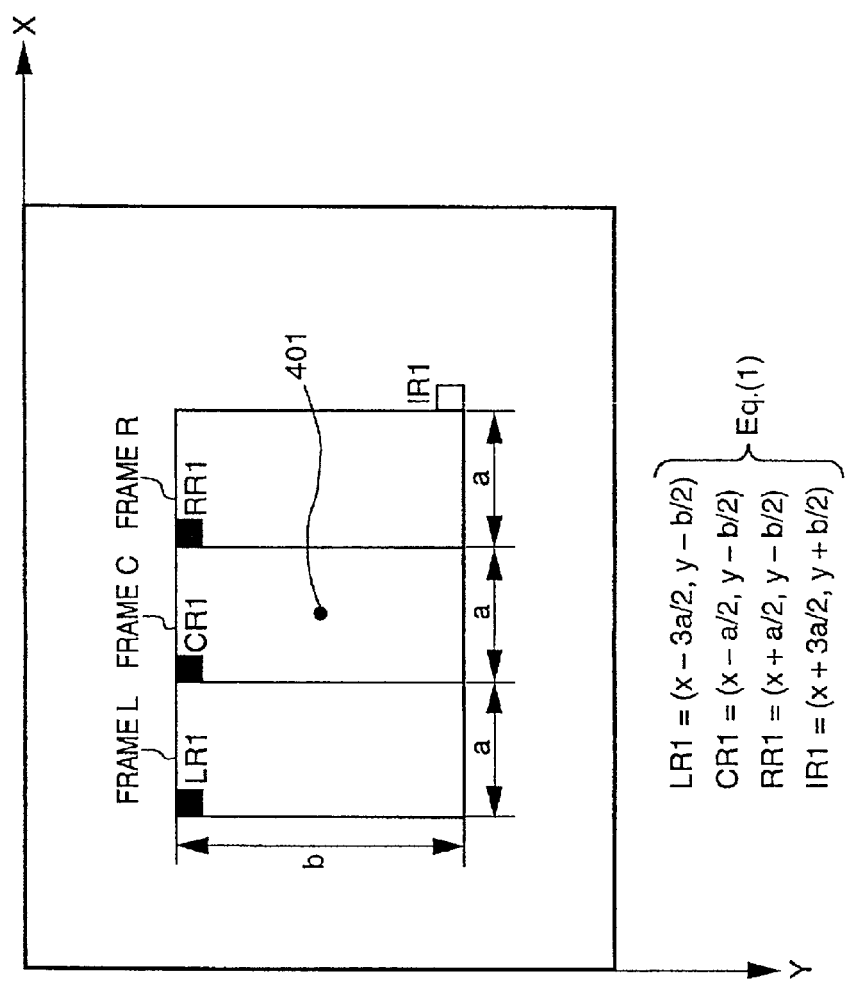

FIG. 5

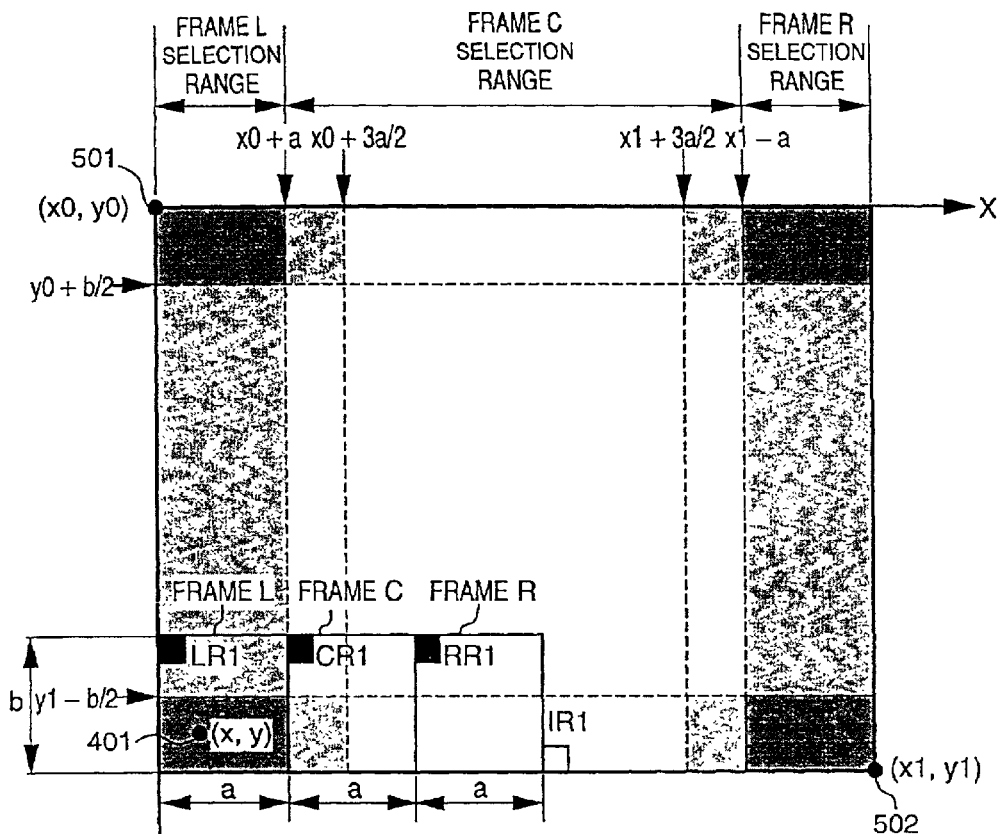

DISTANCE MEASUREMENT FRAME GATE START / END COORDINATES $$LR1 = (x - 3a/2, y - b/2)$$
$$CR1 = (x - a/2, y - b/2)$$
$$RR1 = (x + a/2, y - b/2)$$
$$IR1 = (x + 3a/2, y + b/2)$$

Eq.(1)

GATE START / END COORDINATE TRANSFORMATION EQUATIONS CONFORMING TO POSITIONAL LIMITS OF POINT STARED AT WHEN DISTANCE MEASUREMENT FRAME MOVES

| LIMITS OF X COORDINATE | TRANSFORMATION EQUATION |
|---|---|
| $x0 \leq x < x0 + a$ | $x = x0 + 3a/2$ |
| $x0 + a \leq x < x0 + 3a/2$ | $x = x0 + 3a/2$ |
| $x0 + 3a/2 \leq x < x1 - 3a/2$ | $x = x$ |
| $x0 - 3a/2 \leq x < x1 - a$ | $x = x1 - 3a/2$ |
| $x1 - a \leq x \leq x1 + a$ | $x = x1 - 3a/2$ |

| LIMITS OF Y COORDINATE | TRANSFORMATION EQUATION |
|---|---|
| $y0 \leq y < y0 + b/2$ | $y = y0 + b/2$ |
| $y0 + b/2 \leq y < x1 - b/2$ | $y = y$ |
| $y1 - b/2 \leq y < y1$ | $y = y1 - b/2$ |

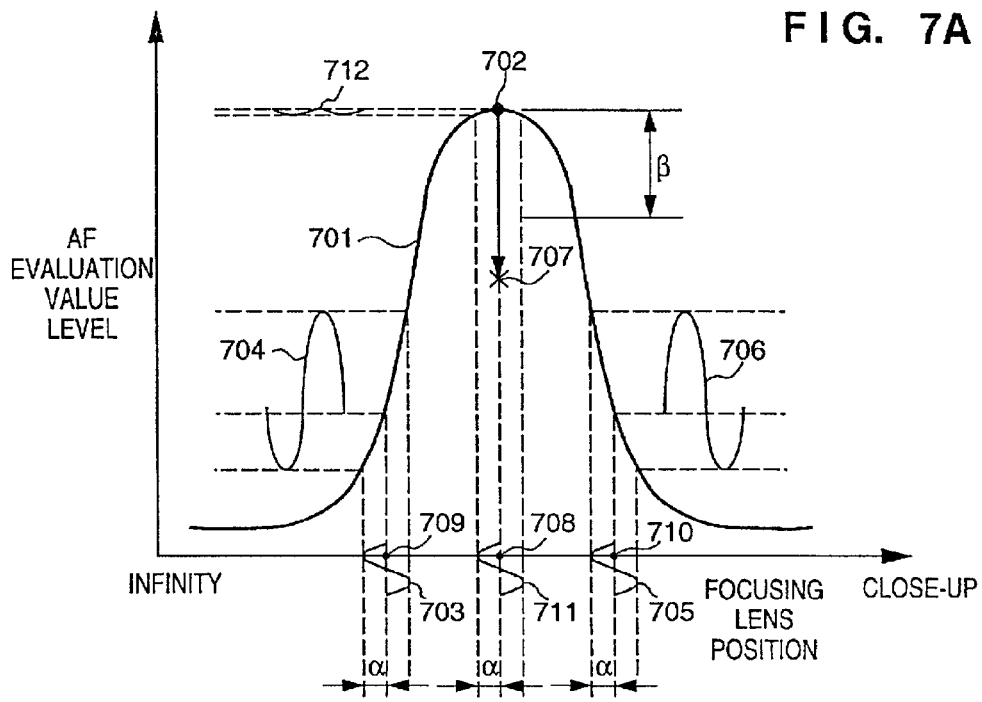

δ : MINIMUM DISTRACTION CIRCLE
α : WOBBLING AMPLITUDE

| LENS OPENING | 0 | 1 | 2 | 3 | 4 | 5 | 6 | 7 |
|---|---|---|---|---|---|---|---|---|
| AMPLITUDE α IN NON-LINE-OF-SIGHT DETECTION MODE | δ | 1.4δ | 2δ | 2.8δ | 4δ | 5.7δ | 8δ | 11.3δ |
| AMPLITUDE α IN LINE-OF-SIGHT DETECTION MODE | 0.5δ | 0.7δ | δ | 1.4δ | 2δ | 2.8δ | 4δ | 5.7δ |

FIG. 7C

| MODE | NON-LINE-OF-SIGHT DETECTION MODE | LINE-OF-SIGHT DETECTION MODE |
|---|---|---|
| RESTART DETERMINATION THRESHOLD VALUE β | 20% | 40% |

FIG. 7D

| MODE | NON-LINE-OF-SIGHT DETECTION MODE | LINE-OF-SIGHT DETECTION MODE |
|---|---|---|
| HILL CLIMBING SPEED | MAXIMUM SPEED | 60% OF MAXIMUM SPEED |

VIDEO CAMERA SYSTEM WITH INTERCHANGEABLE LENS ASSEMBLY

This application is a divisional application of U.S. Ser. No. 08/712,161, filed Sep. 11, 1996, now U.S. Pat. No. 6,396,540 which is incorporated herein in its entirety.

BACKGROUND OF THE INVENTION

This invention relates to a lens assembly and an image sensing device ideal for use in a video camera system of the type having an interchangeable lens assembly.

Automatic focusing (AF) used in video equipment such as video camera relies upon the so-called "hill-climbing method" according to which focusing is performed by extracting high-frequency components from a video signal obtained from an image sensing device such as a CCD and driving a camera lens so as to maximize a mountain-shaped curve representing the characteristic of the high-frequency components.

This automatic focusing method is advantageous in that special optical members for focusing are not required and focusing can be performed accurately regardless of whether distance to the subject is long or short.

An example in which such an automatic focusing method is used in a video camera whose lens assembly can be interchanged will be described with reference to FIG. 9.

A conventional variable-power lens assembly 916 includes a variable-power lens 902 and a compensating lens 903 mechanically connected by a cam. When zooming is performed manually or under power, the variable-power lens 902 and compensating lens 903 move in unison. The variable-power lens 902 and compensating lens 903 are collectively referred to as zoom lenses. In a lens system of this type, a front lens 901, which is situated closest to the subject, serves as the focusing lens and is moved along the optic axis to perform focusing.

Light that has passed through this group of lenses forms an image on the image sensing surface of an image sensing device 904 in a camera body 917, whereby the incident light is photoelectrically converted to an electric signal and outputted as a video signal.

The video signal is applied to a CDS/AGC circuit 905, which is composed of a correlated dual-sampling circuit and an automatic gain control circuit. The CDS/AGC circuit 905 samples and holds the video signal and then amplifies the signal to a predetermined level. The amplified signal is converted to digital video data by an A/D converter 906 and these data are then applied to a processing circuit, which is the next stage of the camera, to be converted to a standard television signal.

The video signal that has been converted to the digital video data by the A/D converter 906 enters a bandpass filter (hereinafter referred to as a "BPF") 907.

The BPF 907 extracts high-frequency components, the level of which changes in dependence upon the state of focusing, from the video signal, and a gate circuit 908 picks out only a signal that corresponds to a portion that has been set on a focal-point detection area on a screen picture. A peak-hold circuit 909 holds the peak of the signal at intervals synchronized to a whole-number multiple of a vertical synchronizing signal and generates a focus (AF) evaluation value.

This AF evaluation value is accepted by an AF microcomputer 910 in the camera body 917. The AF microcomputer 910 decides a focusing motor speed conforming to the degree of focusing and decides focusing motor drive direction in such a manner that the AF evaluation value will increase. The speed and direction of the focusing motor are sent to a lens microcomputer 911.

The lens microcomputer 911 performs focusing by driving the focusing lens 901 along the optic axis, this being achieved by driving a motor 913 via a motor driver 912 in response to a command from the microcomputer 910.

The microcomputer 910 decides the driving direction and speed of the zoom lenses 902, 903 in conformity with the status of a zoom switch 918 and sends these signals to a zoom motor driver 914 in the lens assembly 916 to drive the zoom lenses 902, 903 via a zoom motor 915.

The camera body 917 is detachable from the lens assembly 916 so that a different lens assembly may be connected.

The image sensing apparatus shown in FIG. 9 is capable of having its lenses interchanged and for this reason the controls for automatic focusing are provided in the camera 917. Consequently, when the response of automatic focusing is decided so as to be optimum for a specific lens, there are occasions where the respones will not be optimum for another lens. It is difficult to realize optimum performance with regard to all lenses capable of being attached to the camera.

The applicant has previously proposed an image sensing apparatus in which the controls for automatic focusing are provided on the side of the lens assembly and a focusing signal necessary for the purpose of executing focusing control is delivered from the body of the image sensing apparatus to the lens assembly.

Automatic focusing described above relies upon a mechanism in which the image sensing apparatus such as a camera automatically judges the photographic conditions and adjusts lens position to achieve a state construed to be suited to the photographic conditions. As a result, situations can arise in which the intentions of the photographer are not reflected in the video obtained.

For example, consider a situation in which a subject in the distance and a subject close by are both present in the area of the screen picture. If automatic focusing is performed on the basis of information representing the entirety of the screen picture in which the images are currently appearing, one of the plurality of subjects mentioned above will be brought into focus. However, the image sensing apparatus cannot determine whether this is the main subject that the photographer wishes to focus upon. In order to avoid such situations as much as possible, the general practice is to use a technique in which emphasis is placed upon measuring the distance to the subject located at the center of the screen picture (this is referred to as "weighted-center distance measurement") and automatic focusing is executed based upon the results of measurement.

The reason for this is that when the photograph performs photography, often the main subject is located in the center of the picture. However, if the main subject is located somewhere other than the center of the picture, there are instances where focusing cannot be carried out properly with respect to the main subject. This is the chief disadvantage of this system.

To improve upon this, the specification of Japanese Patent Application No. 4-1541656 discloses an image sensing apparatus in which the photographer looking at the finder is capable of selecting the main subject by his or her line of sight in such a manner that the main subject will be brought to the best focus regardless of where it is located in the screen picture. In accordance with this line-of-sight position detection distance measurement method, it is possible for the position of the main subject to be changed at will while limiting the distance measurement area.

The positioning designating means for selecting the main subject is not limited to line-of-sight detecting means. For example, it is possible to conceive of position designating means which decides direction of movement and position by synthesizing amount of movement in two dimensions using a pointing device such as a joystick or mouse.

In general, the distance measurement area in the weighted-center distance measurement" method is set to be large relative to the screen in such a manner that a subject not located in the center will be focused appropriately. With the line-of-sight position detection distance measurement method, the distance measurement area is set to be small relative to the screen so that competing subjects near and far will not coexist in the distance measurement area. This is so that the camera can be directed toward the main subject to achieve optimum focus regardless of where the main subject is located in the screen picture.

However, when it is attempted to realize the function for selecting the main subject with the interchangeable-lens image sensing apparatus having the automatic focusing controls provided in the lens assembly, the distance measurement area on the screen changes in conformity with a change in the position of the main subject and so does the focusing signal extracted from the distance measurement area. Accordingly, whether a change in the focusing signal is ascribable to a change in the subject distance that accompanies a camera operation such as panning or to a change in the distance measurement area that accompanies a change in the position of the main subject cannot be distinguished merely by delivering the focusing signal from the body of the image sensing apparatus to the focusing control section of the lens assembly.

For example, when a person walking from left to right on the screen is followed by position designating means described above, the focusing signal changes with movement of the subject even though there is no change in the distance to the subject. As a consequence, the lens microcomputer performs a focusing operation upon erroneously judging that the subject has gone out of focus. This causes inadvertent blurring of the subject.

Further, in the example described above, the lens assembly is incapable of recognizing the distance measurement method. Consequently, the automatic focusing operation is unstable in the line-of-sight position detection distance measurement method, the foundation of which is a small distance measurement area that is readily susceptible to the influence of camera operation and changes in the subject, the result of which is frequent changes in the focusing signal. Thus, if an attempt is made to control automatic focusing on the side of the lens assembly in the camera system described above, many problems arise in terms of control between the camera and lens assembly.

SUMMARY OF THE INVENTION

Accordingly, an object of the present invention is to provide a lens assembly and image sensing apparatus in which a desired subject among a variety of subjects can be focused stably under a variety of photographic conditions even when various lens assemblies are attached.

A video camera system according to the present invention, a camera constituting a part of this system and a lens assembly are characterized by the elements described below.

Specifically, a camera having an interchangeable lens assembly capable of processing an image signal comprises pointing means for pointing to any position on a screen of the camera, area setting means for setting a prescribed area at any position pointed to by the pointing means, extracting means for extracting a prescribed signal component from an image signal contained in the above-mentioned image signal and corresponding to the prescribed area set by the area setting means, and generating an evaluation value relating to the imaging state of the screen, and transmitting means for transmitting information relating to an prescribed area, information representing status of the area setting means and the evaluation value to the lens assembly.

In a preferred embodiment, the prescribed area is a focal-point detecting area for detecting a focal point of the lens assembly, and the evaluation value relating to an imaged state represents state of focus of the lens assembly.

In a preferred embodiment, the pointing means adopts a position as the above-mentioned any position by detecting line of sight of the operator directed into the screen.

By way of example, the camera may be provided with one more area setting means for setting a focal-point detecting area at a predetermined position on the screen, with either of the area setting means being selectable by selecting means.

Further, a lens assembly capable of being attached to and detached from a camera comprises drive means for driving a lens possessed by the lens assembly, receiving means for receiving, from the camera, an evaluation value relating an imaging state of the screen, information relating to a set area on the screen and information representing operation of the set area, and control means for controlling the drive means based upon the evaluation value, the information relating to the set area and the information representing the operation of the set area received from the receiving means.

In a preferred embodiment, the set area is a focal-point detecting area for detecting the focal point of the lens assembly, and the evaluation value relating the imaging state represents state of focus of the lens assembly.

In a preferred embodiment the information representing the operation of the set area indicates whether the focal-point detection area is currently changing, and the control means inhibits a control operation during a change in the focal-point detection area and changes the control operation to a prescribed operation when the change in the focal-point detection area has ended.

In the camera and lens assembly constructed as set forth above, an image signal captured by the camera and the information relating to the set area on the screen are transmitted to the lens assembly, and the setting of the prescribed area and generation of the evaluation value relating to the imaging state of the screen may be performed not by the camera but by the lens assembly based upon the information transmitted. In this case the image signal is normalized by the camera before it is transmitted to the lens unit.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

FIG. 4 is a diagram for describing the resetting of signals in various distance measurement frames set on a screen as well as data transfer timing;

FIG. 5 is a diagram for describing an operation for resetting a distance measurement frame that conforms to a change in line-of-sight detection position on the screen as well as the timing of a data transfer operation;

FIGS. 7A to 7D are diagrams for describing a change in focal-point evaluation value versus movement of a focusing lens and for explaining a wobbling operation;

DESCRIPTION OF THE PREFERRED EMBODIMENTS

Embodiments of the present invention will now be described in detail with reference to the drawings.

Figure 1:
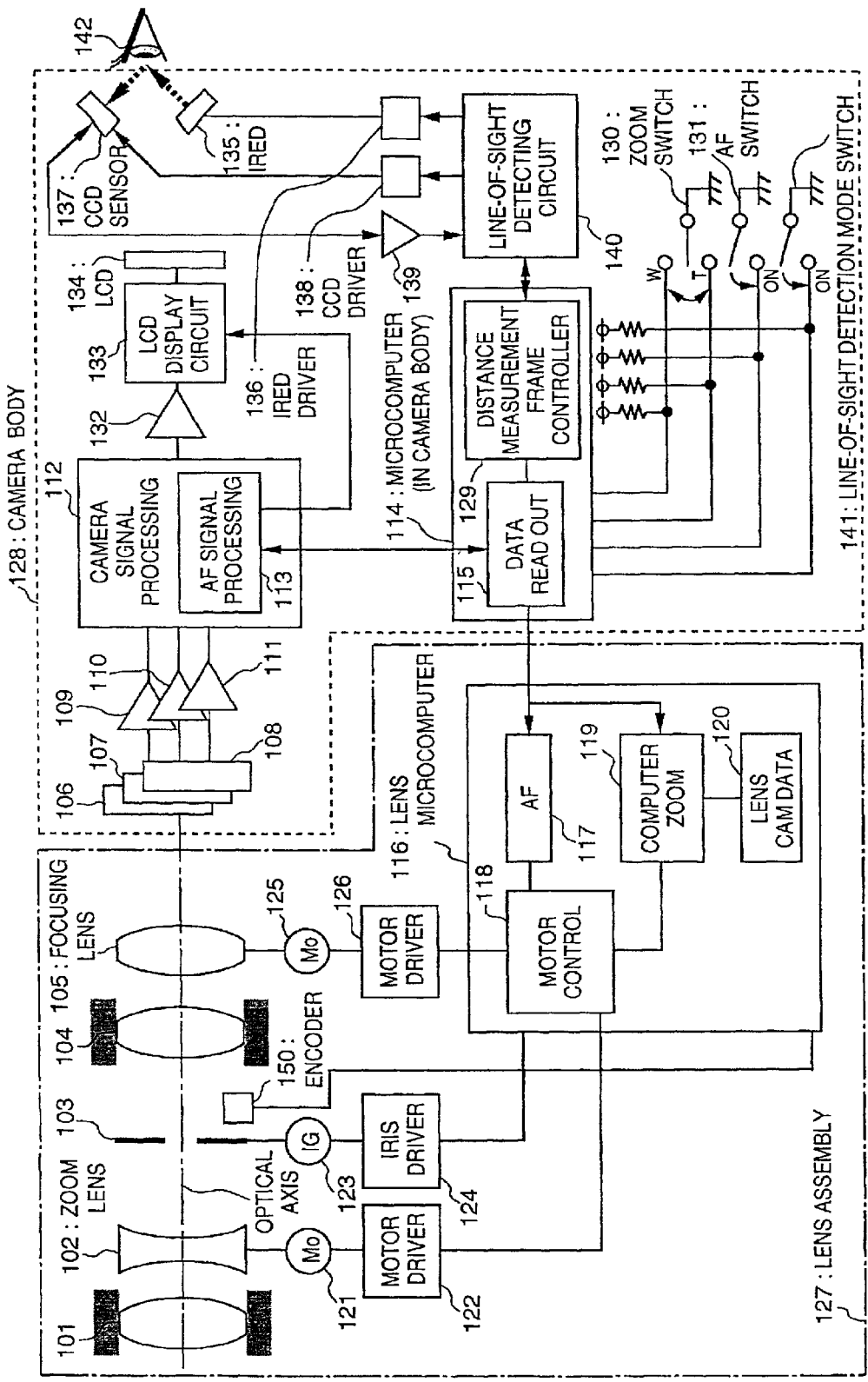
FIG. 1 is a block diagram illustrating a first embodiment in which the present invention is applied to a video camera with an interchangeable lens.

FIG. 1 is a block diagram illustrating the construction of a first embodiment of the present invention. A lens assembly 127 and a camera body 128 are capable of being detached and construct a so-called interchangeable lens assembly system.

Light from a subject forms an image on the image sensing surfaces of image sensing devices 106~108 such as CCDs through a first lens group 101 that is fixed, a second lens group 102 for performing zooming, a diaphragm 103, a third lens group 104 that is fixed and a fourth lens group 105 (hereinafter referred to as a focusing lens) having a both a focusing function and a compensating function, which compensates for movement of the focal plane due to zooming.

The red component of the three component colors forms an image on the image sensing device 106, the green component forms an image on the image sensing device 107 and the blue component forms an image on the image sensing device 108.

The images formed on the image sensing surfaces of the respective image sensing devices 106~108 are photoelectrically converted to image signals. The image signals are amplified to optimum levels by respective amplifiers 109, 110, 111, the amplified signals enter a camera signal processing circuit 112 to be converted to a standard television signal, the television signal is amplified to a predetermined level by an amplifier 132, and the amplified television signal is displayed as the sensed image on a finder of a liquid crystal monitor 134 via an LCD display circuit 133.

This embodiment is provided with a line-of-sight detecting device for detecting the line of sight of the operator on the finder screen picture. The point gazed at in the finder is detected as set forth below.

An IRED (infrared ray emitting diode) driver 136 drives an IRED 135 by a control signal from a line-of-sight detecting circuit 140. Infrared light emitted by IRED 135 is reflected by an eyeball 142 and the reflected infrared light has its optical path changed via a dichroic mirror (not shown), which reflects only the infrared light. As a result, the reflected infrared light impinges upon an image sensor 137, such as a CCD, provided for the purpose of detecting line of sight.

A circuit 138 drives the CCD image sensor 137 so that the infrared light reflected by the eyeball 142 is converted to an electric signal via the sensor 137. The resulting electric signal is sent to the line-of-sight detecting circuit 140 again via an amplifier 139.

The eyeball 142 observes the liquid crystal monitor 134 displaying the captured picture. What position on the display screen of the liquid crystal monitor 134 is being looked at by the eyeball 142 can be detected by the line-of-sight detecting device (which corresponds to pointing means constituting a feature of the present invention) constituted by the line-of-sight detecting circuit 140.

By virtue of the line-of-sight detecting device described above, the coordinates of the line-of-sight position are detected from the output signal of the amplifier 139 and the coordinates are transmitted as line-of-sight coordinate information from the line-of-sight detecting circuit 140 to a distance measurement frame controller 129 in a microcomputer 114, which is provided in the camera body 128.

In accordance with the status of a line-of-sight detection mode switch 141, the distance measurement frame controller 129 decides the position and size of a distance measurement frame (a focal-point detection area is described by being referred to as the distance measurement area) on the finder screen picture using the line-of-sight position information from the line-of-sight detecting circuit 140. The distance measurement frame information thus decided is read out in accordance with a data readout program in the microcomputer 114 and the information is transmitted to an AF (autofocus) signal processing circuit 113. The distance measurement frame controller 129 corresponds to area setting means constituting a feature of the present invention.

The AF signal processing circuit 113 extracts an AF evaluation value in the distance measurement frame. In order for the photographer to be notified of the point currently being looked at in the line-of-sight detection mode, a video signal and a signal for displaying the distance measurement frame are mixed by the LCD display circuit 133 to display a line-of-sight frame on the liquid crystal monitor 134.

In a case where the line-of-sight detection mode has not been selected by the line-of-sight detection mode switch 141, the distance measurement frame controller 129 decides the position and size of the distance measurement frame in such a manner that center-weighted distance measurement is performed emphasis is given to measuring the distance to the subject at the central portion of the screen, sends the line-of-sight detecting circuit 140 information that inhibits the line-of-sight input function and inhibits the display of the distance measurement frame. As a result, the line-of-sight frame is not displayed on the liquid crystal monitor 134. The line-of-sight detection mode switch 141 corresponds to selecting means which, according to a feature of the present invention, selects a focus area.

The video signal that enters the camera signal processing circuit 112 enters the AF signal processing circuit 113 at the same time. The AF evaluation value generated by the AF signal processing circuit 113 is read out in accordance with the data readout program 115 in the microcomputer 114 and is transferred to a lens microcomputer 116 together with information indicating in which distance measurement frame state the evaluation value has been extracted (namely information indicating the line-of-sight input ON/OFF status of the line-of-sight detection mode switch 141 and information indicating the point being looked out, which information is obtained from the line-of-sight detecting circuit 140).

The microcomputer 114 reads in the states of a zoom switch 130 and an AF switch 131 and sends signals indicative of these states to the lens microcomputer 116.

It should be noted that this transmission of the information such as the focal-point evaluation value and status of the distance measurement frame is implemented by communication functions possessed by the lens microcomputer 116 on the side of the lens unit 127 and the microcomputer 114 in the camera body. These communication functions correspond to transmitting means and receiving means of the present invention. The lens microcomputer 116 corresponds to control means for performing actual focusing control in the present invention.

When the AF switch 131 is open (OFF) and the zoom switch 130 is being pressed, the lens microcomputer 116, on the basis of the information received from microcomputer 114 in the camera body and in accordance with a computer zoom program 119, sends a signal to a zoom motor driver 122 to drive the motor in the telephoto or wide-angle direction, depending upon the direction in which the zoom switch 130 is being pressed. As a result, the zoom lens 102 is driven via the zoom motor 121. At the same time, the lens microcomputer 116 refers to lens cam data 120 and sends a signal to a focusing motor driver 126 to drive the focusing lens 105 via a focusing motor 125 so that a compensating operation that eliminates blurring can be executed. Zooming is implemented by these operations. It should be noted that the focusing lens 105, focusing motor driver 126 and focusing motor 125 correspond to drive means constituting a feature of the present invention.

More specifically, when a zooming operation is performed by driving a zoom lens in an inner-focus type lens assembly, driving of the zoom lens is accompanied by a change in the position of the focal point. This means that a compensating function is necessary to drive the focusing lens and compensate for the change in the position of the focal point.

The lens cam data 120 are obtained by storing a plurality of curves which indicate a change in focal-point position per each subject distance when the zoom lens is driven. On the basis of zoom lens position and focusing lens position, the computer zoom block (program) 119 refers to the plurality of curves of the stored lens cam data 120 and specifies the corresponding curve, thereby deciding the driving speed and driving direction of the focusing lens 105.

In a case where the focusing lens is situated at a position not stored in the lens cam data 120, a curve that would be situated between curves is calculated from the plurality of curves to set the curve in virtual fashion and implement control.

When the AF switch 131 is closed (turned ON) and the zoom switch 130 is held depressed, it is required that the focused state be maintained. Therefore, in accordance with the computer zoom program 119, the lens microcomputer 116 refers to the AF evaluation value sent from the microcomputer 114 in the camera body and performs the zooming operation while maintaining the position at which the AF evaluation signal is maximized.

Further, when the AF switch 131 is turned on and the zoom switch is not being held depressed, the lens microcomputer 116, in accordance with an AF program 117, performs an automatic focusing operation by sending a signal to the focusing motor driver 126 to drive the focusing compensating lens 105 via the focusing motor 125 in such a manner that the AF evaluation value sent from the microcomputer 114 is maximized.

Figure 2:
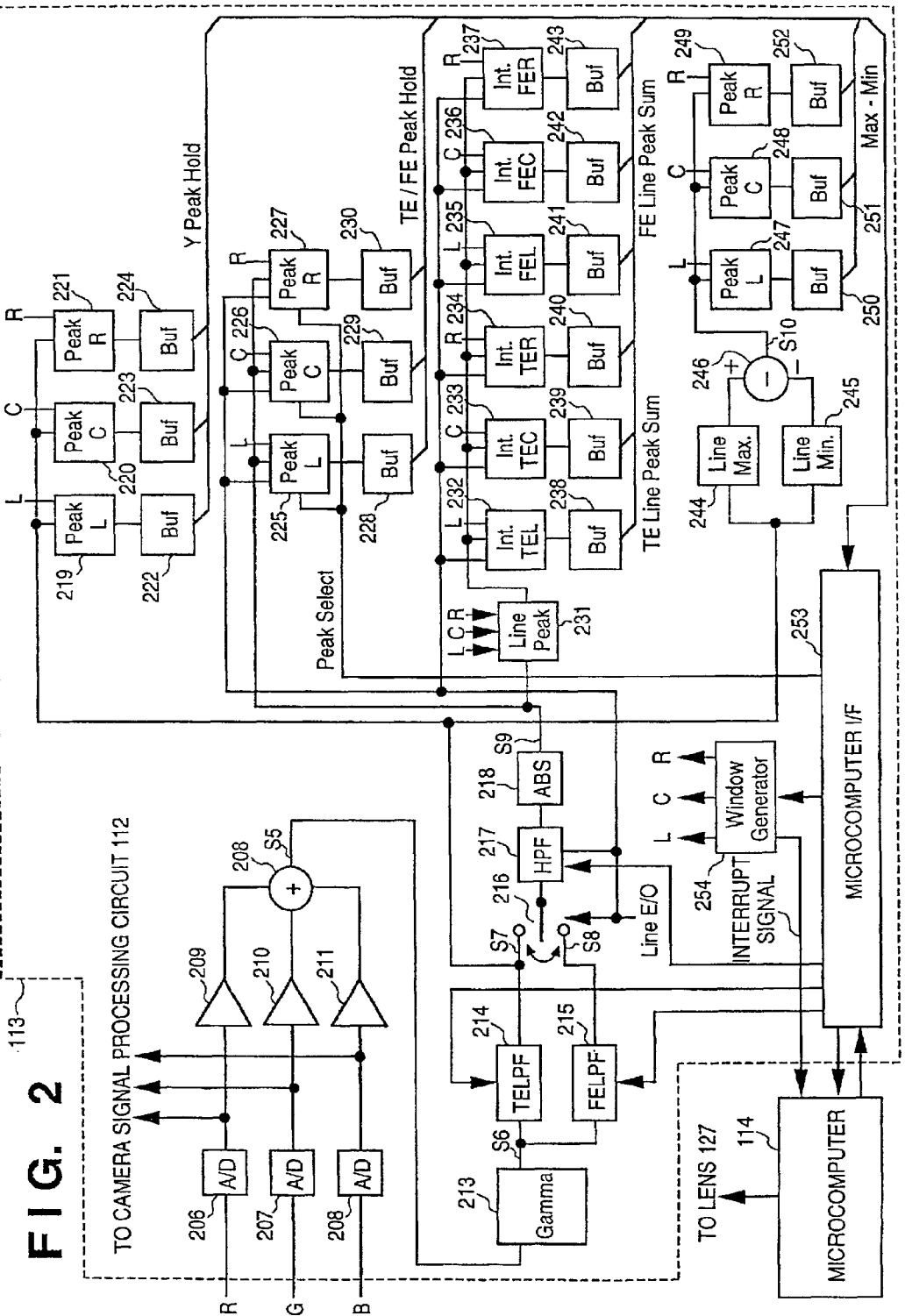
FIG. 2 is a block diagram illustrating the elements of an AF signal processing circuit on the side of a camera body in the first embodiment of the invention.

The AF signal processing circuit 113 in the camera signal processing circuit 112 will now be described with reference to FIG. 2. The AF signal processing circuit 113 corresponds to extracting means for extracting the focal-point evaluation value in accordance with a feature of the invention.

The outputs of the R (red), G (green), B (blue) image sensing devices applied to respective optimum levels by the amplifiers 109, 110, 111, respectively, are supplied to the AF signal processing circuit 113, where these outputs are converted to digital signals by A/D converters 206, 207, 208, respectively. The digital signals are applied to the camera signal processing circuit 112 and, at the same time, are amplified to appropriate levels by amplifiers 209, 210, 211, respectively. The amplified signals are added by an adder 208, the output of which is a luminance signal S5 for automatic focusing.

The luminance signal S5 enters a gamma circuit 213 and applies a gamma conversion in accordance with a gamma curve set in advance, whereby a signal S6 whose low-luminance components are emphasized and high-luminance components are suppressed. This signal S6 resulting from the gamma conversion enters a TE-LPF 214, which is a high-pass filter (hereinafter referred to as an "LPF") with respect to cut-off frequency, and an FE-LPF 215, which is an LPF with respect to cut-off frequency. These LPFs extract low-frequency components based upon respective filter characteristic information decided by the microcomputer 114 via a microcomputer interface 253. The TE-LPF 214 produces an output signal S7 and the FE-LPF 215 an output signal S8.

The signals S7 and S8 are switched between selectively by a switch 216 in dependence upon a Line E/O signal, which is a signal for identifying whether a horizontal line in one screen is an odd-numbered or even-numbered line. The selected signal is applied to a bypass filter (hereinafter referred to as an "HPF") 217.

More specifically, the signal S7 is supplied to the HPF 217 in case of an odd-numbered line and the signal S8 is supplied to the HPF 217 in case of an even-numbered line.

The HPF 217 extracts only high-frequency components based upon respective filter characteristic information for each of the odd- and even-numbered lines decided by the microcomputer 114 via the microcomputer interface 253. An absolute-value circuit 218 takes the absolute value of this signal, thereby producing a positive signal S9. More specifically, the signal S9 alternately indicates the level of the high-frequency components extracted by filters whose filter characteristics differ for the even- and odd-numbered lines. As a result, high-frequency components which differ can be obtained by scanning one screen.

The timing at which various information is accepted within the AF signal processing circuit 113 will be described with reference to FIG. 3, which illustrates the layout of each area for focal-point detection on the screen. The outer frame is the effective image screen of the outputs from the image sensing devices 106, 107, 108.

The three partitioned inner frames are gate frames for focal-point detection. A frame L on the left side, a frame C at the center and an frame R on the right side are formed in accordance with an frame L generating gate signal, a frame C generating gate signal and an frame R generating gate signal, respectively, outputted by a frame generating circuit 254.

A reset signal is outputted for each of the L, C, R frames at the starting point of each of the L, C, R frames, initialization (reset) signals LR1, CR1, RR1 are generated and integrating circuits 232~237, peak-hold circuits 219~221, 225~227, 247~249, etc., are reset.

A data transfer signal IR1 is generated at the end of scanning of the focal-point detection area comprising the L, C, R frames, and the integrated values from the integrating circuits and peak-hold values from the peak-hold circuits are transferred to respective buffers.

The scanning of even fields is indicated by solid lines, the scanning of odd fields is indicated by dashed lines, even lines select the TE-LPF output and odd lines select the FE-LPF output for both the even and odd fields.

The signal S9 is supplied to the peak-hold circuits 225, 226 and 227, which are for holding the peak values of the signals in the L, C and R frames, respectively, the peak values of the high-frequency components in the respective frames are detected and enter a line peak-hold circuit 231 so that the peak value of each horizontal line is detected.

Figure 3:
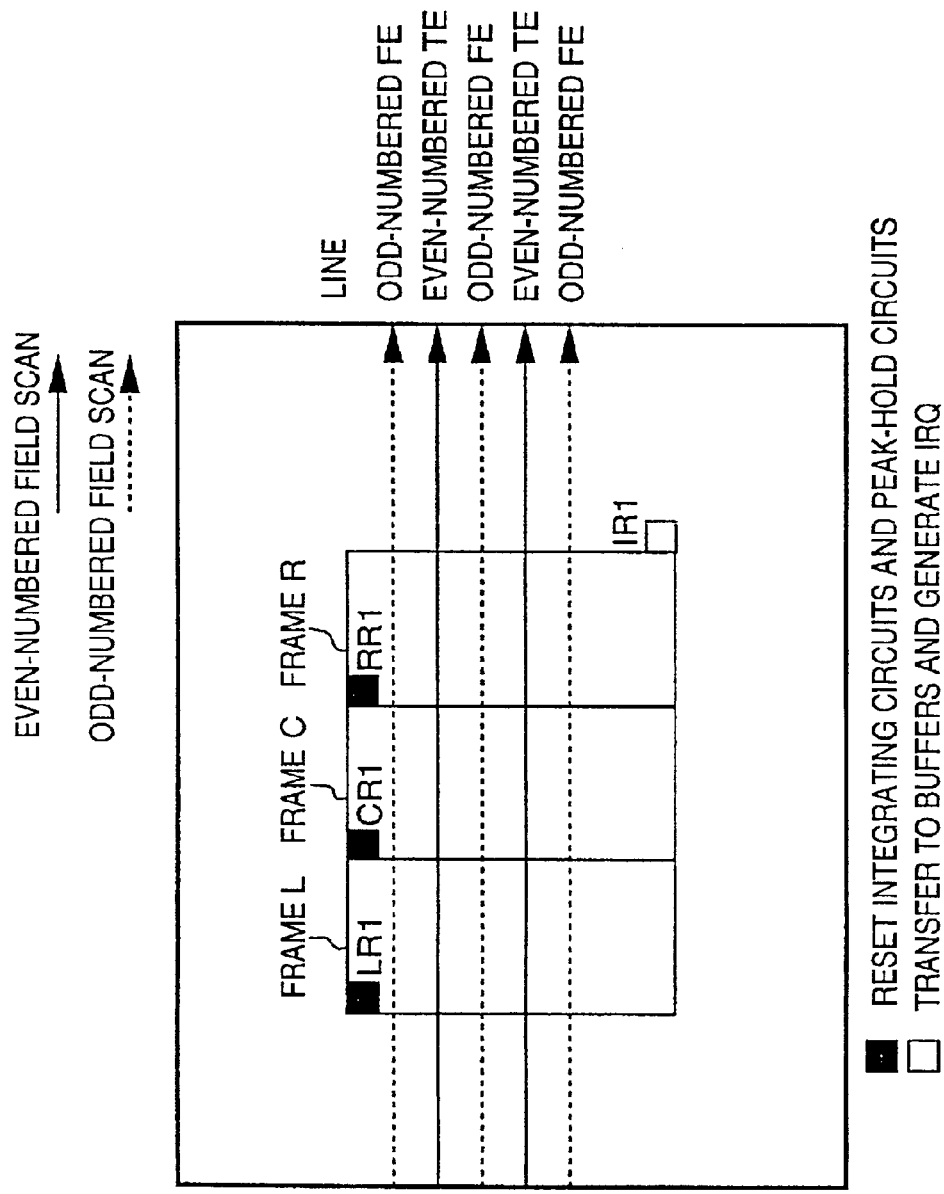
FIG. 3 is a diagram for describing the detection timing of various focal-point evaluation values.

In accordance with a command supplied by the microcomputer 114 via the microcomputer interface 253, the frame generating circuit 254 generates the gate signals L, C, R for forming the focal-point adjustment L, C, and R frames at the positions on the screen shown in FIG. 3.

The gate signal L for forming the frame L outputted by the frame generating circuit 254 and the Line E/O signal (produced by the microcomputer 114), which is the signal for identifying whether a horizontal line is even- or odd-numbered, enter the peak-hold circuit 225. The peak-hold circuit 225 is initialized at the location of LR1 at the upper left or starting point of the focal-point adjustment frame L, as shown in FIG. 3, and holds the peak of the signal S9 of each frame of either even or odd lines designated by the microcomputer 114 via the microcomputer interface 253. At IR1 at the lower right, i.e., when scanning of the entire area for focal-point adjustment ends, the peak-hold circuit 225 transfers the peak-hold value within the frame to an area buffer 228, whereby a TE/FE peak evaluation value is generated.

Similarly, the frame C outputted by the frame generating circuit 254 and the Line E/O signal enter the peak-hold circuit 226. The peak-hold circuit 226 is initialized at the location of CR1 at the upper left or starting point of the focal-point adjustment frame C, as shown in FIG. 3, and holds the peak of the signal S9 of each frame of either even or odd lines designated by the microcomputer 114 via the microcomputer interface 253. At IR1 at the lower right, i.e., when scanning of the entire area for focal-point adjustment ends, the peak-hold circuit 226 transfers the peak-hold value within the frame to an area buffer 229, whereby a TE/FE peak evaluation value is generated.

Similarly, the frame R outputted by the frame generating circuit 254 and the Line E/O signal enter the peak-hold circuit 227. The peak-hold circuit 227 is initialized at the location of RR1 at the upper left or starting point of the focal-point adjustment frame C, as shown in FIG. 3, and holds the peak of the signal S9 of each frame of either even or odd lines designated by the microcomputer 114 via the microcomputer interface 253. At IR1 at the lower right, i.e., when scanning of the entire area for focal-point adjustment ends, the peak-hold circuit 227 transfers the peak-hold value within the frame to an area buffer 230, whereby a TE/FE peak evaluation value is generated.

The signal S9 and the gate signals for generating the L, C, F frames outputted by the frame generating circuit 254 enter the line peak-hold circuit 231, this circuit is initialized at the starting point of each frame in the horizontal direction, and the peak value contained in one line of the signal S9 in the horizontal direction within each frame is held.

The output of the line peak-hold circuit 231 and the Line E/O signal, which identifies whether the horizontal line is odd- or even-numbered, enter the integrating circuits 232, 233, 234, 25, 236, 237. At the same time, the gate signal for generating the frame L outputted by the frame generating circuit 254 enters the integrating circuits 232, 235, the gate signal for generating the frame C outputted by the frame generating circuit 254 enters the integrating circuits 233, 236, and the gate signal for generating the frame R outputted by the frame generating circuit 254 enters the integrating circuits 234, 237.

The integrating circuit 232 is initialized at LR1 at the upper left or starting point of the focal-point adjustment frame L and adds the output of the line peak-hold circuit 231 to an internal register immediately before the end of even lines in each frame. At IR1, the integrating circuit 232 transfers the peak-hold value within the frame to an area buffer 238, whereby a line-peak integration evaluation value is generated.

The integrating circuit 233 is initialized at CR1 at the upper left or starting point of the focal-point adjustment frame C and adds the output of the line peak-hold circuit 231 to an internal register immediately before the end of even lines in each frame. At IR1, the integrating circuit 233 transfers the peak-hold value within the frame to an area buffer 239, whereby a line-peak integration evaluation value is generated.

The integrating circuit 234 is initialized at RR1 at the upper left or starting point of the focal-point adjustment frame R and adds the output of the line peak-hold circuit 231 to an internal register immediately before the end of even lines in each frame. At IR1, the integrating circuit 233 transfers the peak-hold value within the frame to an area buffer 240, whereby a line-peak integration evaluation value is generated.

In the same manner that the above-mentioned integrating circuits 232, 233, 234 perform addition with regard to the data of even lines, the integrating circuits 235, 236, 237 perform addition of data of the odd lines. In other aspects the operation of these integrating circuits is the same as that of the integrating circuits 232, 233, 234 and the results are transferred to area buffers 241, 242, 243, respectively.

The signal S7 enters the peak-hold circuits 219, 220, 221, a line maximum-value hold circuit 244 and a line minimum-value hold circuit 245.

The gate signal for generating the frame L outputted by the frame generating circuit 254 enters the peak-hold circuit 219. The peak-hold circuit 219 is initialized at LR1 at the upper left or starting point of the frame L and holds the peak of the signal S7 in each frame. At IR1, the peak-hold circuit 219 transfers results of peak hold to a buffer 222, whereby a luminance level (hereinafter referred to as a "Y signal") peak evaluation value is generated.

Similarly, the gate signal for generating the frame C outputted by the frame generating circuit 254 enters the peak-hold circuit 220. The peak-hold circuit 220 is initialized at CR1 at the upper left or starting point of the frame C and holds the peak of the signal S7 in each frame. At IR1, the peak-hold circuit 220 transfers results of peak hold to a buffer 223, whereby a Y-signal peak evaluation value is generated.

Similarly, the gate signal for generating the frame R outputted by the frame generating circuit 254 enters the peak-hold circuit 221. The peak-hold circuit 221 is initialized at RR1 at the upper left or starting point of the frame R and holds the peak of the signal S7 in each frame. At IR1, the peak-hold circuit 221 transfers results of peak hold to a buffer 224, whereby a Y-signal peak evaluation value is generated.

The gate signals for generating the L, C, R frames outputted by the frame generating circuit 254 enter the line maximum-value hold circuit 244 and line minimum-value hold circuit 245, which are initialized at the starting point of each frame in the horizontal direction and hold the maximum and minimum values, respectively, contained in the Y signal of one horizontal line of signal S7 in each frame.

The maximum and minimum values of the Y signal held by the line maximum-value hold circuit 244 and line minimum-value hold circuit 245, respectively, enter a subtractor 246. The latter produces a signal S10 representing contrast, namely the difference between the maximum value and the minimum value, and applies the signal S10 to the peak-hold circuits 247, 248, 249.

The gate signal for generating the frame L outputted by the frame generating circuit 254 enters the peak-hold circuit 247. The peak-hold circuit 247 is initialized at LR1 at the upper left or starting point of the frame L and holds the peak of the signal S10 in each frame. At IR1, the peak-hold circuit 247 transfers results of peak hold to a buffer 250, whereby a Max-Min evaluation value is generated.

Similarly, the gate signal for generating the frame C outputted by the frame generating circuit 254 enters the peak-hold circuit 248. The peak-hold circuit 248 is initialized at CR1 at the upper left or starting point of the frame C and holds the peak of the signal S10 in each frame. At IR1, the peak-hold circuit 248 transfers results of peak hold to a buffer 251, whereby a Max-Min evaluation value is generated.

Similarly, the gate signal for generating the frame R outputted by the frame generating circuit 254 enters the peak-hold circuit 249. The peak-hold circuit 249 is initialized at RR1 at the upper left or starting point of the frame R and holds the peak of the signal S10 in each frame. At IR1, the peak-hold circuit 249 transfers results of peak hold to a buffer 252, whereby a Max-Min evaluation value is generated.

At IR1, which is when scanning of the entire vocal-point detection area comprising the frames L, C, R ends, the data in each frame are transferred to the respective buffers 222, 223, 224, 228, 229, 230, 238, 239, 240, 241, 242, 243, 250, 251, 252 and, at the same time, the frame generating circuit 254 sends an interrupt signal to the microcomputer 114 and the data that have been transferred to each buffer are transferred to the microcomputer 114.

More specifically, upon receiving the interrupt signal, the microcomputer 114 reads the data in each of the buffers 222, 223, 224, 228, 229, 230, 238, 239, 240, 241, 242, 243, 250, 251, 252 via the microcomputer interface 253 until the scanning within the next frame L, frame C, frame R is completed and the next item of data is transferred to each buffer, and transfers the read data to the lens microcomputer 116 in sync with a vertical synchronizing signal in a manner described later.

The lens microcomputer 116 calculates these focal-point evaluation values, detects the state of focusing, computes the driving speed and driving direction of the focusing motor and controls the drive of the focusing motor, thereby driving the focusing lens 105.

A method of setting positions at which the reset signals LR1, CR1, RR1 in each of the frames L, C, R are generated as well as a position at which the data transfer signal IR1 is generated will now be described with reference to FIGS. 4 and 5.

The position of a point being stared at obtained from the line-of-sight detecting circuit 140 corresponds to a coordinate position on the screen picture [a point 401 (=x,y) on coordinate axes the origin of which is the upper left corner of the screen in FIG. 4]. This position is sent to the distance measurement frame controller 129 in the microcomputer 114 as the coordinates of the center of the distance measurement frame.

The size of the distance measurement frame is decided as a×b (where a is the horizontal width and b the vertical length of each distance measurement frame) by the distance measurement frame controller 129, as illustrated in FIG. 4.

The distance measurement frame controller 129 decides the coordinates of LR1, CR1, RR1, IR1 on the screen in accordance with the equations (1) shown below and sends these coordinates to the gate circuit 254 in the AF signal processing circuit 113, thereby controlling the distance measurement frames L, C, R.

$$LR1=(x-3a/2, y-b/2)$$
$$CR1=(x-a/2, y-b/2)$$
$$RR1=(x+a, y-b/2)$$
$$IR1=(x+3a/2, y+b/2) \quad (1)$$

If a non-line-of-sight detection mode has been selected, the distance measurement frame position (x,y) is set at the center of the screen. When center-weighted distance measurement has been implemented, the variable a, b which decide the size of the distance measurement frame are set to be comparatively large so that even a subject not located in the center can be brought into focus stably.

If the line-of-sight detection mode has been selected, on the other hand, the point stared is free to move about the screen and the size of the distance measurement frame is set to be comparatively small so as to be able to reflect the intentions of the photographer. This limits subjects. When the distance measurement frame position changes in the line-of-sight detection mode, the L, C, R frames move as one on the screen. As a consequence, a case arises where the center position of the frame C does not coincide with the point stared at, as when the point stared at is at one edge of the screen, and the reset signal generating position and data transfer signal generating position of each of the L, C, R frames cannot be determined with equations (1) as they are.

FIG. 5 is a diagram for describing how the reset signal generating positions and data transfer signal generating positions which decide the distance measurement frames are defined in dependence upon a change in the point stared at in the line-of-sight detection mode.

In FIG. 5, numeral 401 denotes the position of the point stared at, 501 a point (x0,y0) at the upper left corner of the screen and 502 a point (x1,y1) at the lower right corner of the screen.

In a case where the point 401 stared at by the photographer is at the lower left of the screen (in a zone where the x coordinate falls within the range $x0 \leq x < x0+a$ and the y coordinate falls within the range $y1-b/2 \leq y \leq y1$), the position of the distance measurement frame is set at the lower left corner of the screen and the distance measurement frame in which the point stared at resides is the frame L, as illustrated in FIG. 5. At this time the positions at which the signals that decide the distance measurement frame positions are generated are as follows:

$LR1=(x0, y1-b)$ $CR1=(x0+a, y1-b)$ $RR1=(x0+2a, y1-b)$ $IR1=(x0+3a, y1)$        (2)

This is equivalent to substituting $x=x0+3a/2$, $y=y1-b/2$ into Equation (1).

Similarly, in a case where the point stared at resides at any point on the screen, the relationship between the position at which the signal that decides the distance measurement frame position is generated and the distance measurement frame in which the point stared at is present can be classified into 5×3=15 areas by the positions of the x and y coordinates of the point stared at (15 areas demarcated by the shaded areas on the screen shown in FIG. 5).

Shown below are transformation equations for the coordinates of the position at which the frame-position decision signal is generated. These are obtained by transforming equations (1), where x and y are the coordinate positions of the point stared at.

| range of x measurement | x-coordinate transformation equation | distance frame in which point stared at exists |
|---|---|---|
| (1) $x0 \leq x < x0 + a$ | $x = x0 + 3a/2$ | frame L |
| (2) $x0 + a \leq x < 0 + 3a/2$ | $x = x0 + 3a/2$ | frame C |
| (3) $x0 + 3a/2 \leq x < x1 - 3a/2$ | $x = x$ | frame C |
| (4) $x1 - 3a/2 \leq x < x1 - a$ | $x = x1 - 3a/2$ | frame C |
| (5) $x1 - a/2 \leq x \leq x1$ | $x = x1 - 3a/2$ | frame R |

| range of y | y-coordinate transformation equation |
|---|---|
| (1) $y0 \leq y < y0 + b/2$ | $y = y0 + b/2$ |
| (2) $y0 + b/2 \leq y < y1 - b/2$ | $y = y$ |
| (3) $y1 - b/2 \leq y \leq y1$ | $y = y1 - b/2$ |

If equations (1) are transformed in conformity with the area in which the point stared at resides, it is possible to determine the coordinates of the position at which the frame-position decision signal is generated and it is possible to ascertain whether the distance measurement frame containing the point stared at is L, C or R.

The information relating to distance measurement frame status determined as set forth above is supplied to the lens microcomputer 116 so that stable, high-performance automatic focusing can be achieved in both the line-of-sight and non-line-of-sight detection modes of an interchangeable lens system.

The distance measurement frame information supplied is, first of all, information as to whether the distance measurement frame selected by line of sight is the L, C oframe R R. If this information is not provided, the lens microcomputer will not be able to determine which of the AF evaluation values obtained from the three distance measurement frames and delivered to the lens microcomputer is to be used for which distance measurement frame in execution of focal-point adjustment. This means that the subject that the photographer wishes to focus on will not be capable of being brought into focus.

The information further includes information as to whether the mode is the line-of-sight detection mode or the non-line-of-sight detection mode. The fact that the size of the distance measurement frame differs depending upon the mode is as set forth above. However, since the number of scanned lines on the screen picture varies depending upon the size of the distance measurement frame, the AF evaluation value also changes.

Accordingly, if the mode to switch the changeover has been made is not known, a change in the evaluation value will always judged as being due to a change in the subject and this will result in unstable automatic focusing.

Further, since the AF evaluation value in the line-of-sight detection mode in the case of a distance measurement frame of small size reacts more sensitively in response to even a small change in the subject, automatic focusing lacking stability would result if AF control were performed in the same manner as in the non-line-of-sight detection mode.

The third item of information supplied to the lens assembly is information indicating which distance measurement frame position is currently changing in conformity with a change in the point being stared at. During movement of a distance measurement frame, the AF evaluation value fluctuates sharply even when there is no change in the distance to the main subject. If AF control is performed on the basis of the evaluation value at such time, an erroneous operation will be carried out and cause the photographer to experience discomfort, such as slight defocusing from the focused state.

How the distance measurement frame information delivered to the lens assembly is used in AF control to prevent the above-mentioned problems from occurring will be described later with reference to FIG. 6.

Described next will be how the microcomputer performs an automatic focusing operation using the TE/FE peak evaluation value, TE line-peak integration evaluation value, FE line-peak integration evaluation value, Y-signal peak evaluation value and Max-Min evaluation value in each of the distance measurement frames whose position/size has been decided. It should be noted that these evaluation values are transmitted to the lens microcomputer 116 in the lens assembly and that actual control is executed by the lens microcomputer 116.

The characteristics and usage of these evaluation values will now be described.

The T/E peak evaluation value is an evaluation value which represents the degree of focusing. Since this is a peak-hold value, it has comparatively little dependence upon the subject, is influenced little by blurring caused by camera movement and is ideal for determining degree of focusing and in judging restarting.

Though the TE line-peak integration evaluation value and FE line-peak integration evaluation value also represent degree of focusing, these are low-noise evaluation values stabilized by the effects of integration and therefore are ideal for judging direction.

With regard to both the peak evaluation values and line-peak integration evaluation values, the TE values extract higher high-frequency components and therefore are ideal for use in a focusing operation in the vicinity of the focused state. Conversely, the FE values are ideal for use far from the focused state when blurring is pronounced. Accordingly, these signals are added or are used upon being changed over selectively in dependence upon the TE level, thereby making it possible to perform automatic focusing having a wide dynamic range from a highly blurred state to the vicinity of the focused state.

The Y-signal peak evaluation value and Max-Min evaluation value are dependent upon the subject but not very dependent upon the degree of focusing. In order to judge the degree of focusing, judge restarting and judge direction reliably, these evaluation values are ideal for ascertaining a change in the subject, movement of the subject, etc. The focal-point evaluation value is used for the purpose of normalization in order to eliminate the influence of a change in brightness.

In other words, whether a subject is a high-luminance or low-luminance subject is judged based upon the Y-signal peak evaluation value, whether contrast is high or low is judged based upon the Max-Min evaluation value and the size of the crests in the characteristic curves of the TE/FE peak evaluation value, TE line-peak integration evaluation value and FE line-peak integration evaluation value are predicted and corrected, thereby making possible optimum AF control.

These evaluation values are transferred from the camera body 128 to the lens assembly 127 and are supplied to the lens microcomputer 116 in the lens assembly 127 so that an automatic focusing adjustment may be carried out.

One example of a method of controlling focusing adjustment using the above-mentioned distance measurement frame information delivered to the lens assembly will be described with reference to FIG. 6. The flowchart shown in FIG. 6 represents processing executed by the lens microcomputer 116 in the lens assembly and is written with regard to an automatic focusing algorithm of the AF program 117 at a specific focal length when zooming is not being performed.

Figure 6:
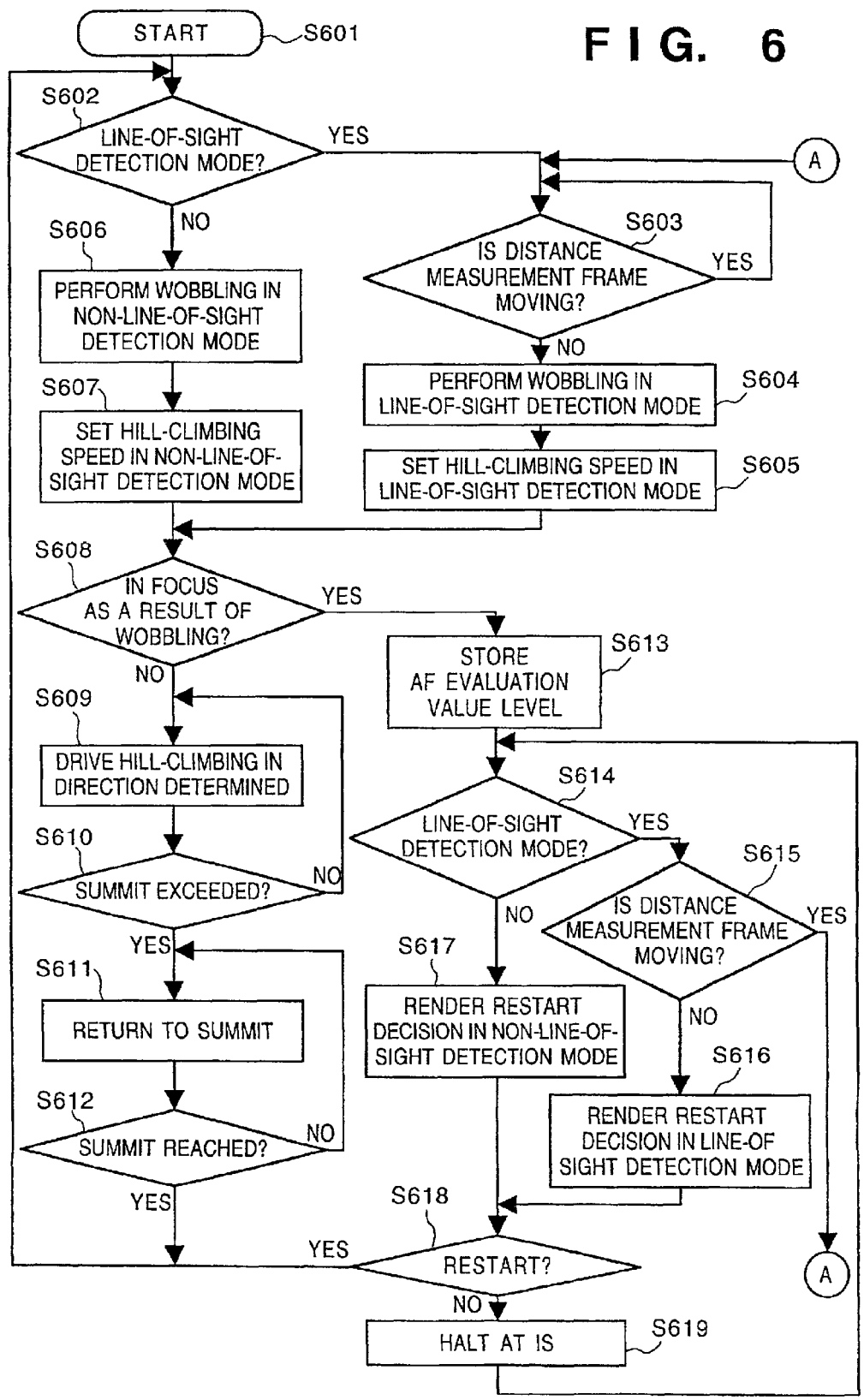
FIG. 6 is a flowchart illustrating an AF control operation performed on the side of the lens assembly.

Though not illustrated, there is a processing routine separate from the processing of FIG. 6. In this separate processing routine, which evaluation value from which distance measurement frame among the AF evaluation values within the three distance measurement frames delivered from the microcomputer 114 in the camera body is stressed to perform focal-point adjustment is selected and processing is executed accordingly.

AF control processing is started at step S601. Whether the prevailing mode is the line-of-sight detection mode is determined at step S602 based upon the information delivered by the microcomputer 114 in the camera body. If the prevailing mode is the non-line-of-sight detection mode, then the program proceeds to step S606, where a wobbling operation for the non-line-of-sight detection mode is carried out.

The prevailing mode is determined to be the line-of-sight detection mode at step S602, then it is determined, on the basis of the distance measurement frame information delivered by the microcomputer 114, whether the distance measurement frame is currently moving (step S603). If the distance measurement frame is moving ("YES" at step S603), the system stands by with the focusing lens being held at rest. At the completion of movement, wobbling for the line-of-sight detection mode is performed at step S604.

The wobbling operation performed at the time of the line-of-sight and non-line-of-sight detection modes will be described with reference to FIGS. 7A through 7D.

FIG. 7A is a diagram illustrating the change (701) in the level of the AF evaluation value obtained when the focusing lens is moved from infinity to close-up with respect to a given subject. The position of the focusing lens is plotted along the horizontal axis and the AF evaluation value is plotted along the vertical axis. The point at which focus is achieved is point 702, at which the AF evaluation value is at the maximum level. (The position of the in-focus focusing lens is point 708.) The position of the focusing lens is controlled in such a manner that the AF evaluation value is maximized at all times. A wobbling operation is performed to determine whether the in-focus point is on the side in the direction of close-up or the side in the direction of infinity.

The wobbling operation is an operation for accepting the AF evaluation value while driving the focusing lens slightly to determine whether the camera is currently in focus or out of focus (i.e., to determine whether the in-focus point is on the side in the direction of close-up or the side in the direction of infinity when the camera is out of focus). For example, if the current focusing position is on the side of infinity (position 709) with respect to the in-focus point, the wobbling operation is executed to move the lens slightly from the direction of infinity (the focusing lens position is moved as shown at 703, with the time axis extending into the page). When this is done, the AF evaluation value obtained is as indicated at 704.

If the focusing lens position is on the close-up side with respect to the in-focus position (position 710), the lens is driven slightly in the manner shown at 705. When this is done, the AF evaluation value is obtained as indicated at 706. Since the phases of the change in signal level with respect to a change in the same driving direction of the focusing lens are opposite to each other at 704 and 706, discriminating this fact makes it possible to ascertain the focusing-lens drive direction in which the in-focus point is present.

Further, when the lens is driven slightly (711) at the summit of the crest 701, the AF evaluation value (712) obtained has a small amplitude and is different in shape. As a result, whether the camera is out of focus or in focus can be determined.

With wobbling in the vicinity of the in-focus point, the photographer sees a blurred image depending upon the amplitude of drive ($\alpha$ in FIG. 7A). Accordingly, it is required to establish the minimum amplitude at which the evaluation value is satisfactorily obtained.

On the other hand, there are cases where an evaluation value amplitude sufficient for judging direction is not obtained at the foot of the crest 701 even if the focus lens is driven slightly. Accordingly, it is desired that the amplitude of lens drive be made comparatively large in this region.

In the non-line-of-sight detection mode, it is presumed that the subject photographed will undergo a major change when the photographer operates the camera as by panning the camera. The AF evaluation value at this time changes from the level at the summit of the crest, at which a given subject is in focus, to the level at the foot of the crest of another subject. Accordingly, it is required that the amplitude $\alpha$ of minute drive in the wobbling operation be enlarged to a certain extent.

On the other, in the line-of-sight detection mode, it is presumed that the point at which the photographer gazes will move with regard to a subject appearing in the finder. Since an AF evaluation value of a certain level can be obtained even when the main subject moves, it is desired that the amplitude $\alpha$ of minute drive be made as small as possible.

Accordingly, the driving amplitude $\alpha$ in the wobbling operation is set, as shown in FIG. 7B, in dependence upon the depth of field (lens opening), with the values of $\alpha$ in the line-of-sight detection mode differing from those in the non-line-of-sight detection mode.

In FIG. 7B, δ represents the circle of least confusion. No blurring results if the position of the focusing lens is moved from the in-focus position by an amount equivalent to δ or less. In other words, at step S606 in FIG. 6, wobbling is performed using the value of a prevailing in the non-line-of-sight detection mode in FIG. 7B. At step S604, wobbling is performed using the wobbling amplitude set by α in the line-of-sight detection mode in FIG. 7B.

During movement of the distance measurement frame, the wobbling operation is not carried out, as set forth above in connection with step S603.

This is to prevent a situation in which, when the photographer is in the process of moving the point stared at up to the intended main subject, bringing subjects encountered along the way into focus would be contrary to the intent of the photographer. Further, this is to prevent a situation in which blurring is induced. Specifically, during movement of the line-of-sight distance measurement frame, a subject may no longer be present in the frame or, even if it is present, the output of the in-focus evaluation value is not obtained satisfactorily or the signal fluctuates sharply because the distance measurement area is moving. Direction cannot be discriminated correctly in this state, even if the wobbling operation is performed, and erroneous operation results. This brings about blurring.

Further, there is a good possibility that the main subject has changed with movement of the point stared at. Accordingly, the wobbling operation is performed at the end of movement of the distance measurement frame for the purpose of verifying that the in-focus state has been attained.

Step S605 in FIG. 6 is for setting speed of focusing movement for hill-climbing of the curve in the line-of-sight detection mode.

In a case where the non-line-of-sight detection mode has been determined at step S602, the above-described wobbling operation is carried out at step S606 and then focusing speed for hill-climbing at the time of the non-line-of-sight detection mode is set at step S607.

As mentioned above, a highly blurred state readily occurs if the camera performs an operation such as panning in the non-line-of-sight detection mode. It is desired, therefore, that the focusing lens be driven as fast as possible to shorten the time needed to achieve the focused state without the in-focus point being reached from the foot of the crest of the characteristic curve 701 of the in-focus evaluation value shown in FIG. 7A.

In the line-of-sight detection mode, on the other hand, the range of fluctuation of the AF evaluation value is small in comparison with that which prevails at the time of non-line-of-sight detection mode (the fluctuation occurs frequently because the distance measurement frame is small), and hill-climbing is from the mid-portion of the crest of the characteristic curve 701. Consequently, when the speed of hill-climbing is too high, considerable defocusing accompanies a mistake in terms of direction of hill-climbing and the photographer realizes that the in-focus direction has been passed. (In the non-line-of-sight detection mode, the highly blurred state will already exist even if the in-focus direction has been mistaken for the opposite direction. The photographer, therefore, tends not to notice.) Accordingly, the speed of focusing movement for hill-climbing is set in dependence upon whether the mode is the line-of-sight detection mode or non-line-of-sight detection mode.

It is determined at step S608 whether the result of the wobbling operation performed at step S604 or S606 is that the camera is currently in focus or out of focus. If it is determined that the camera is in focus, movement of the focusing lens is stopped and a transition is made to a processing routine for monitoring restart. The routine starts from step S613.

If the decision rendered at step S608 is that the camera is out of focus, then the program proceeds to step S609. Here hill-climbing in the direction which is the result of judgment based upon the wobbling operation is executed at the focusing speed set by step S605 or S607.

It is determined at step S610 whether the in-focus point, i.e., the summit of the in-focus evaluation signal, has been exceeded. Hill-climbing continues if it has not been exceeded. If it has been exceeded, the focusing lens is returned to the summit (steps S611, 612).

There are also cases where the subject changes owing to panning or the like during the operation for returning to the summit. Accordingly, if the focusing lens has at last attained the summit, it is determined whether the current position is truly the summit, i.e., the in-focus point. To accomplish this, the program returns to the processing from step S602 onward, movement of the line-of-sight frame is monitored and the wobbling operation is performed again.

If the camera is judged to be in focus at step S608, the program proceeds to the processing from step S613 onward, namely the routine for monitoring restart.

If the prevailing mode is judged to be the line-of-sight detection mode ("YES" at step S614), it is determined at step S615 whether the distance measurement frame is moving. If the frame is moving ("YES" at step S615), the program returns to step S603 so that processing for verifying the in-focus state is executed after the end of movement.

If it is found at step S615 that the distance measurement frame is not moving, restart for the line-of-sight detection mode is determined at step S616. Since the distance measurement frame is small, the fluctuation in the level of the AF evaluation value occurs frequently owing to subjects moving into and out of the frame. This is taken into account at step S616 so that the restart operation is made more difficult than in the case of the weighted-center distance measurement frame in the non-line-of-sight detection mode, thereby improving the stability of the line-of-sight AF operation.

Operation will be described in detail with reference to FIG. 7A. Assume that the focusing lens is at position 708 and that the level of the AF evaluation value at this time is 702, as shown in FIG. 7A. The level at 702 corresponds to the AF evaluation value level stored at step S613 in FIG. 6.

The level of the evaluation value declines from 702 to 707 owing to a change in the subject. The determination as to whether restart is to be executed at this time is performed in the following manner:

If the level of the evaluation value has changed from the level of 702 by an amount in excess of a restart threshold value β, then it is determined to execute restart. If the amount of fluctuation in the evaluation value is less than the restart threshold value β, the decision rendered is not to execute restart.

The threshold value β is set to different values for the line-of-sight detection mode and non-line-of-sight (at steps S616 and S617 in FIG. 6), as illustrated in FIG. 7C. Using the in-focus AF evaluation value level that has been stored at step S613 is adopted as a reference, the settings are made in such manner that restart is executed if the change is greater than 40% of this value in the line-of-sight detection mode or greater than 20% in the non-line-of-sight detection mode.

With reference again to FIG. 6, step S615 is as described above. The reason for not executing the restart decision processing of step S616 during movement of the distance measurement frame detected at step S615 is to assure that restart will not occur each time the point stared at is moved. This is necessary because the AF evaluation value obtained from within the frame fluctuates during movement of the distance measurement frame, as already described.

For example, if the restart decision is allowed during movement of the line-of-sight frame, the AF evaluation value will fluctuate owing to movement of the distance measurement frame even though moving the focusing lens is unnecessary, as when the line of sight is moved with respect to a subject for which there is no change in distance. The result is restart, which is accompanied by the occurrence of defocusing.

The result of the decision rendered at step S616 or S617 is discriminated at step S618. In case of non-restart, the focusing lens is halted as is (step S619) and the program returns to step S614, where restart monitoring is performed again.

If restart is discriminated at step S618, then the program returns to step S602, where the wobbling operation is performed again and direction of movement is discriminated. By repeating this operation, the focusing lens is operated so as to maintain the focused state at all times.

In the loop of this automatic focusing operation, the degree to which velocity control is applied using the TE/FE peak, the absolute level of the crest summit judgment and the amount of change in the TE line-peak integration evaluation value are better for predicting the size of the crest than is judgment of the subject using the Y-peak evaluation value and Max-Min evaluation value, and prediction is based upon these.

<Modification of First Embodiment>

Figure 8:
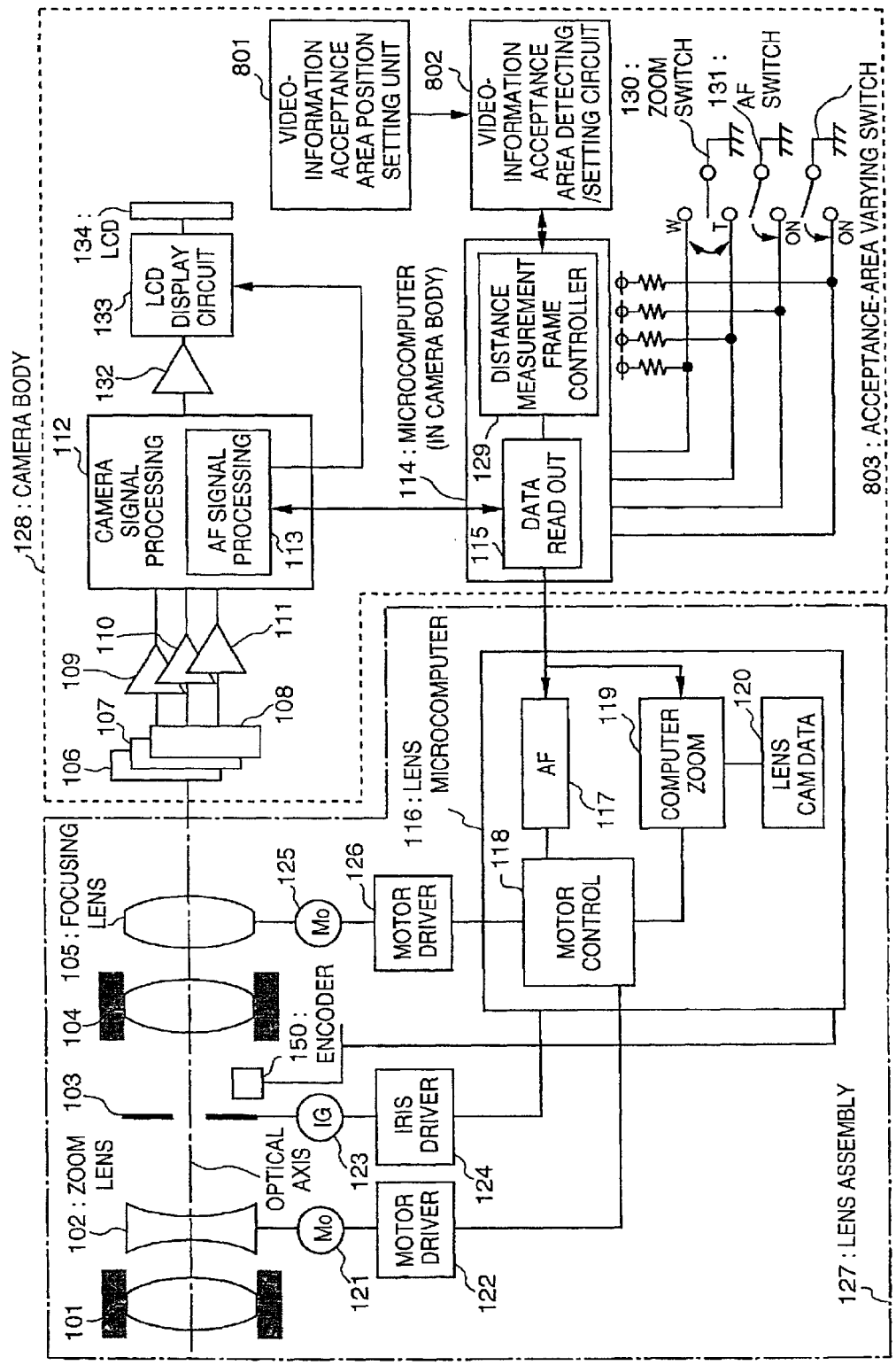
FIG. 8 is a block diagram illustrating a video camera with an interchangeable lens according to a modification of the first embodiment.
Figure 9:
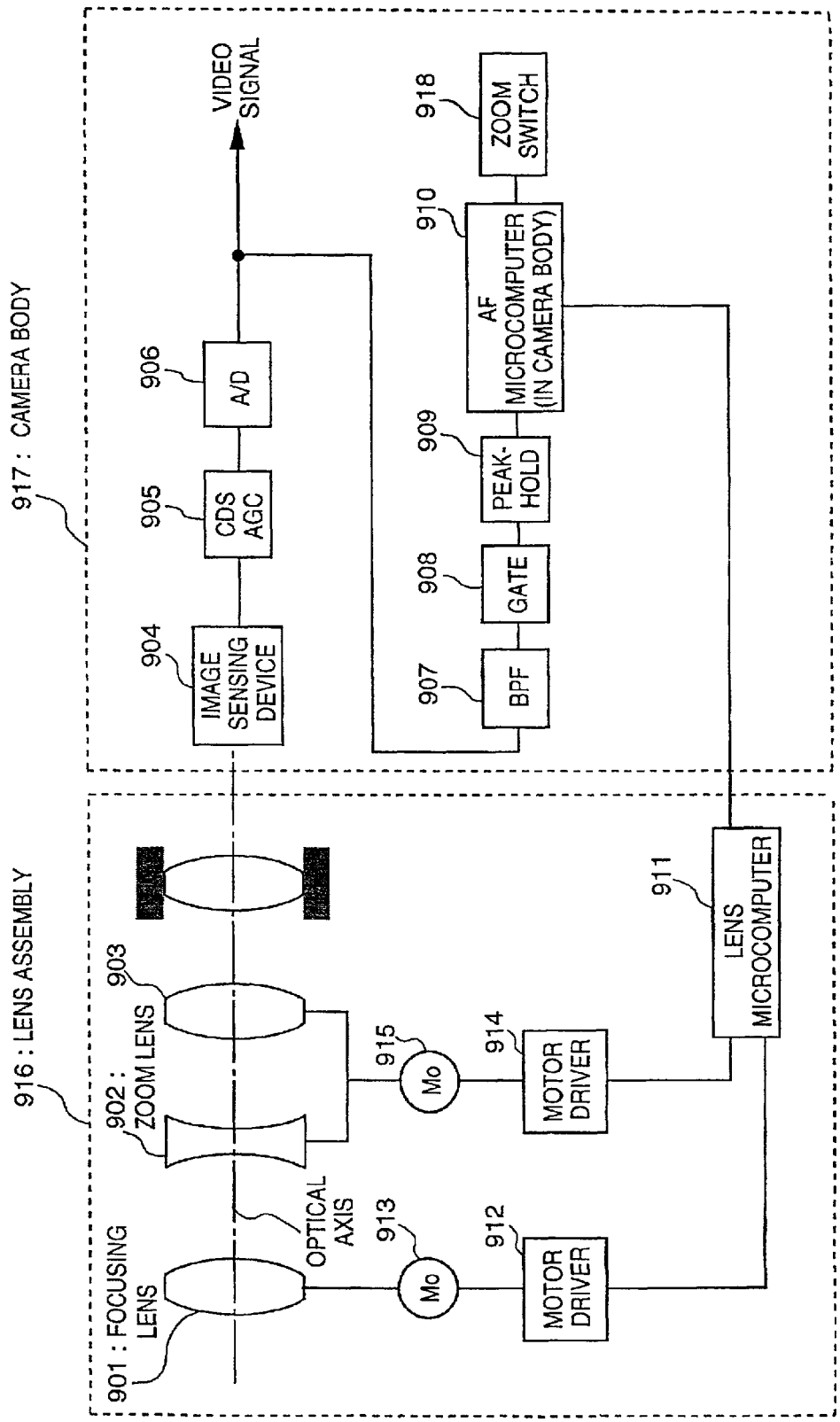
FIG. 9 is a block diagram illustrating an example of a video camera with an exchangeable lens according to the prior art.

FIG. 8 is a diagram illustrating the construction of a modification of the first embodiment of the invention. In the first embodiment, the distance measurement frame setting position is determined by detecting line of sight. In this modification, an example is described in which a video information acceptance area is decided by auxiliary input means, which serves as pointing means, rather than by line-of-sight input. Other elements are the same as those in the first embodiment, are indicated by reference characters the same as those used in FIG. 1 and need not be described again; only the aspects that distinguish this modification from the first embodiment will be described.

Video-information acceptance area setting information accepted by a video-information acceptance area position setting unit 801 is processed by a video-information acceptance area detecting/setting circuit 802 and the processed information is sent to the microcomputer 114 in the camera body.

In dependence upon the status of a switch 803 for effecting a transition to a mode for varying the video-information acceptance area, the microcomputer 114 decides whether or not to use the video-information acceptance area from the area detecting/setting circuit 802 and sends the distance measurement frame information decided by the distance measurement frame controller 129 to the AF signal processing circuit 113 and lens microcomputer 116.

The video-information acceptance area position setting unit 801 may be an ordinary keyboard, a mouse, a track ball or a joystick used as the input devices of a computer.

<Second Embodiment>

A second embodiment of the invention will now be described. This embodiment differs from the first embodiment in that the AF signal processing circuit and distance measurement frame controller are provided in the lens assembly. In other aspects the system configuration is the same as that of the first embodiment and these aspects need not be described again. The description will focus on the aspects that distinguish this embodiment from the first embodiment. Elements of this embodiment identical with those of the first embodiment are designated by like reference characters.

Figure 10:
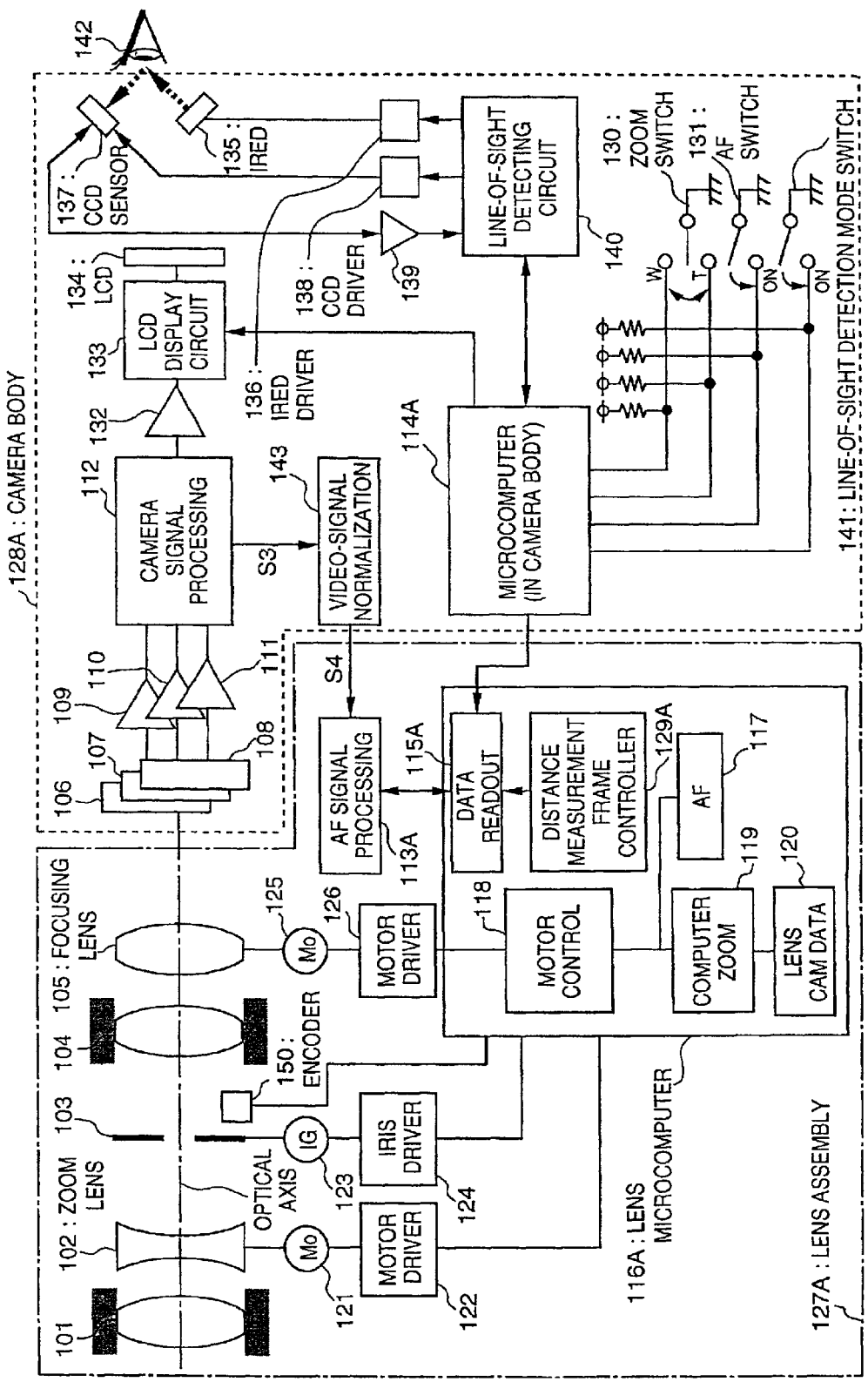
FIG. 10 is a block diagram illustrating a second embodiment in which the invention is applied to a video camera with an interchangeable lens.
Figure 11:
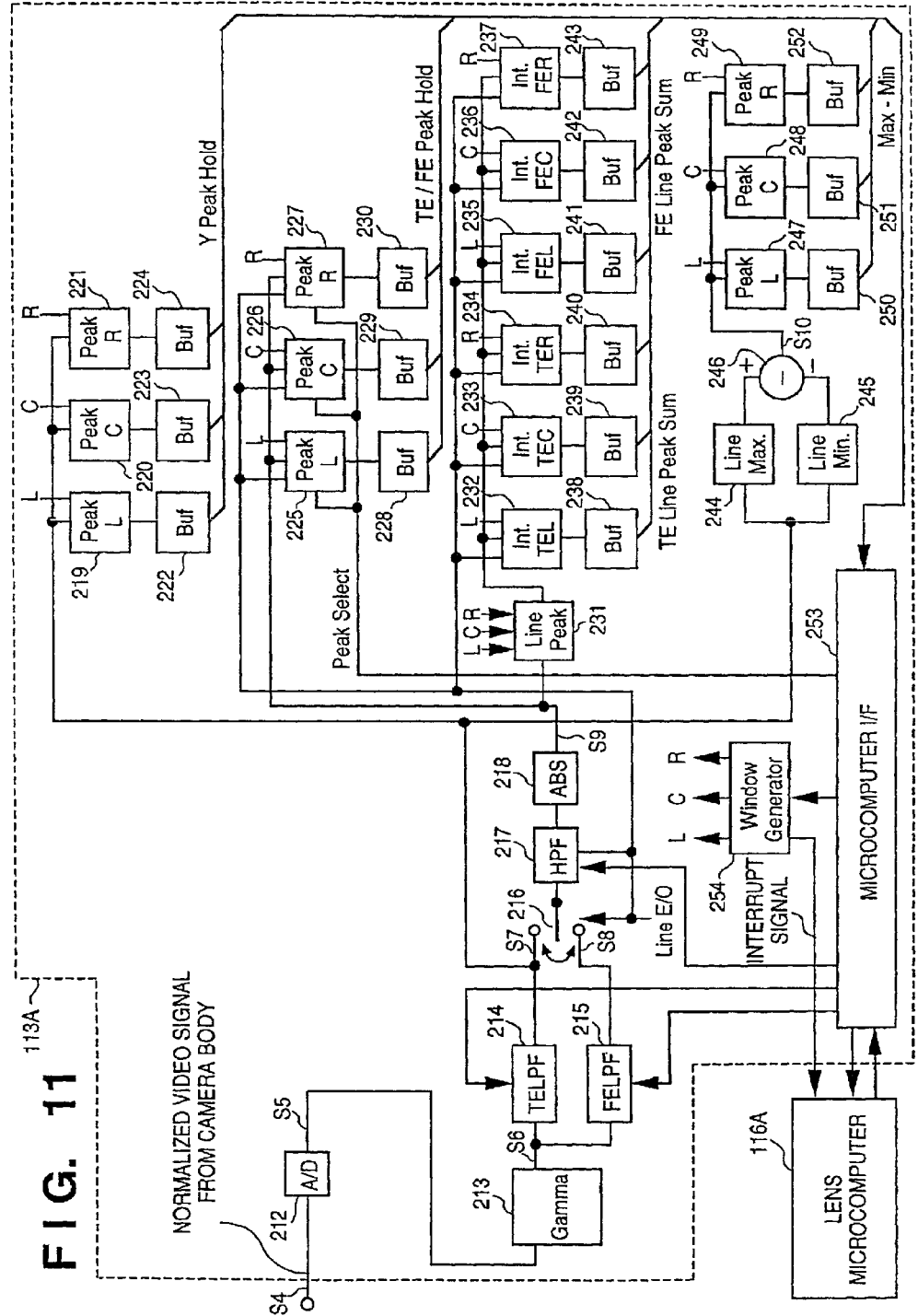
FIG. 11 is a block diagram illustrating the elements of an AF signal processing circuit on the side of a camera body in the second embodiment of the invention.

In FIGS. 10 and 11, a microcomputer 114A sends a lens microcomputer 116A in the lens assembly 127 the line-of-sight position information and the status of the line-of-sight detection mode switch 141. In order to allow the photographer to recognize the point currently being stared at in the line-of-sight detection mode, a video signal and information indicating the position stared at are mixed by the LCD display circuit 133 and the line-of-sight position is displayed on the screen of the LCD monitor 134.

In a case where the line-of-sight detection mode has not been selected by the line-of-sight detection mode switch 141, the microcomputer 114A sends line-of-sight input function inhibiting information to the line-of-sight detecting circuit 140, inhibits display of the line-of-sight position and delivers the center position of the image screen to the lens microcomputer 116A, together with the line-of-sight switch information, as pseudo-line-of-sight position.

The video signal which enters the camera signal processing circuit 112 is converted to a standard television signal and, at the same time, the circuit 112 outputs a gamma-corrected video signal S3 in which R, G, B signals have been mixed. The signal S3 enters a video signal normalizing circuit 143.

The video signal normalizing circuit 143 normalizes the video signal S3 by making the video signal level the same, regardless of the camera, when the same subject is photographed. The normalized video signal is outputted as signal S4.

The normalized video signal S4 is sent from a camera body 128A to a lens assembly 127A via a lens mount.

The lens assembly 127A applies the normalized video signal S4 from the camera body 128A to an AF signal processing circuit 113A, which proceeds to generate an AF evaluation value. The AF evaluation value generated by the AF signal processing circuit 113A is read by the data readout program 115 in the lens microcomputer 116A. The AF signal processing circuit 113A corresponds to the extracting means for extracting the focal-point signal according a feature of the present invention.

A distance measurement frame controller 129A in the lens microcomputer 116A decides the position and size of the focal-point detection area (distance measurement frame) in conformity with the line-of-sight information and status of the line-of-sight detection switch 141 sent from the microcomputer 114A in the camera body, and controls the AF signal processing circuit 113A on the basis of the decided distance measurement frame information in accordance with the data readout program 115A, thereby extracting the AF evaluation value, which corresponds to the position of the point being stared at, from the normalized video signal sent from the camera body.

The states of zoom switch 130 and AF switch 131 are transferred from the microcomputer 114A to the lens microcomputer 116A.

From this point onward the lens microcomputer 116A performs a zooming operation and focusing operation in a manner similar to that of the first embodiment.

<Modification of Second Embodiment>

Figure 12:
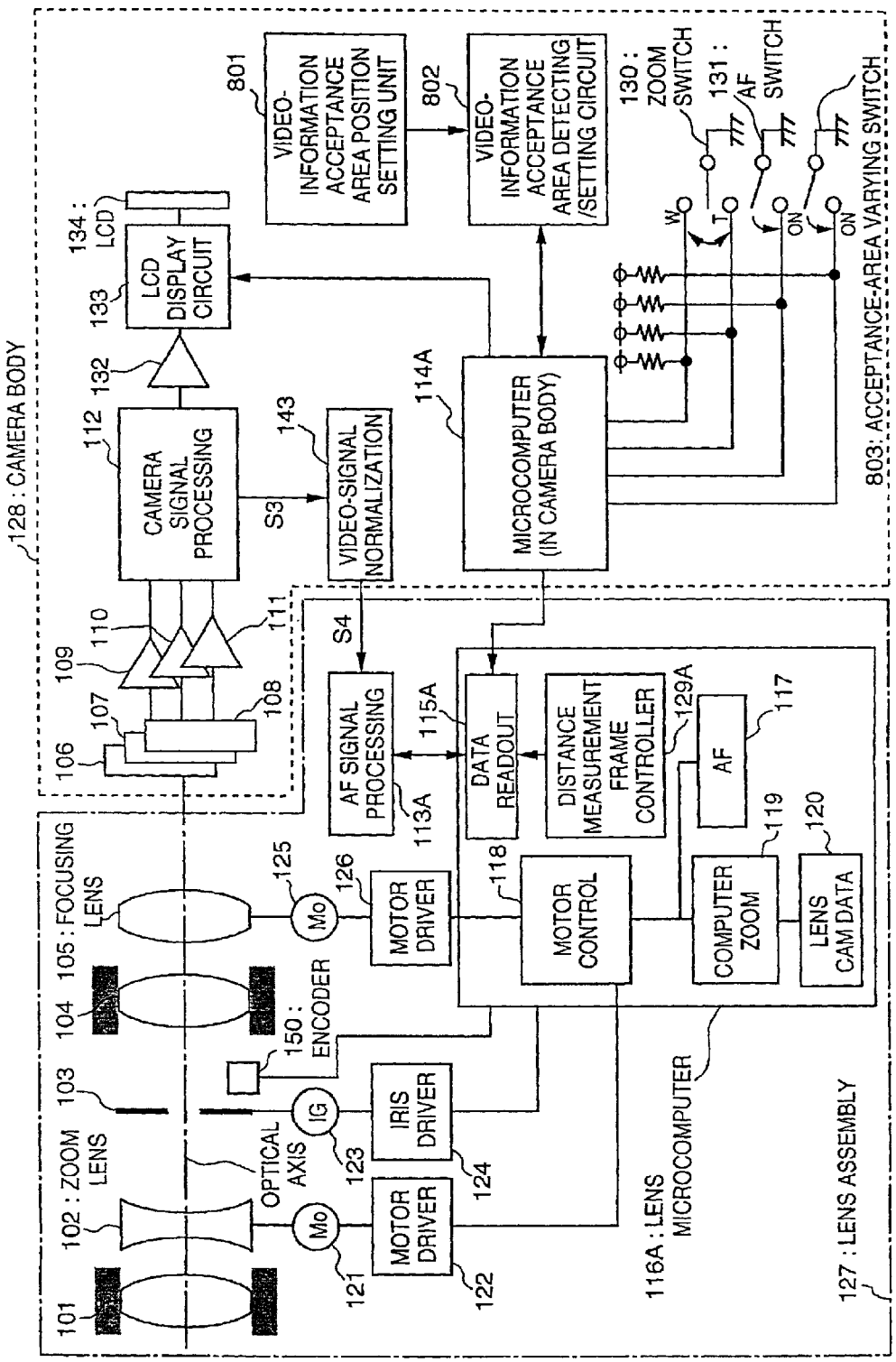
FIG. 12 is a block diagram illustrating a modification of the second embodiment in which the invention is applied to a video camera with an interchangeable lens.

FIG. 12 is a block diagram illustrating a modification of the second embodiment of the present invention. This arrangement is similar to that of FIG. 10 except for the fact that the line-of-sight detection means is not provided. The alternative means, namely the auxiliary input means, also is the same as the auxiliary input means according to the modification (FIG. 8) of the first embodiment and need not be described again.

In accordance with the first embodiment, as described above, a video camera system having an interchangeable lens assembly is so adapted that the setting of an image-information acceptance area on a screen picture and the extraction of image information corresponding to this area are carried out on the side of the camera body, information relating to the area and image information are transmitted to the side of the lens assembly and control based upon these items of information is performed on the side of the lens assembly.

In accordance with the second embodiment, an image signal and information representing a designated position in the screen picture are supplied from the side of the camera body to the lens assembly. On the side of the lens assembly, an image-information acceptance area on the screen is controlled based upon the position information, and the state of the image sensing operation is controlled based upon the image signal corresponding to the image-information acceptance area. As a result, optimum response can be determined for individual lens assemblies without increasing the load on the camera side. This makes it possible to realize a camera system which makes it possible to control, accurately and stably, the imaging of various subjects and a main subject under various photographic conditions.

Further, since control processing for zooming and focusing is executed on the side of the lens assembly, it is unnecessary to provide information for various lens assemblies entirely on the side of the image sensing apparatus, thus alleviating the processing load on the side of the main body of the imaging apparatus.

In particular, the focal-point evaluation value and the information relating to the setting of the focal-point detection area are delivered from the side of the image sensing apparatus to the side of the lens assembly and the controls for automatic focusing are provided on the side of the lens assembly. As a result, even if a variety of lens assemblies are capable of being attached, optimum response can be determined for each individual lens assembly. Moreover, it is possible to realize both the automatic focusing performance of ordinary weighted-center distance measurement and the features of a focal-point detection area setting method, which relies upon pointing means using external input means such as line-of-sight detection. This makes it possible to suitably adjust the focus of a main subject aimed at by the photographer.

Further, information indicating whether the focal-point detection area is currently changing and information representing focusing adjustment mode desired by the photographer is supplied as information relating to the focal-point detection area, and operation by focusing adjustment control is altered in conformity with this information. This makes it possible to prevent a variety of erroneous operations that tend to occur during movement of the focal-point detection area.

As many apparently widely different embodiments of the present invention can be made without departing from the spirit and scope thereof, it is to be understood that the invention is not limited to the specific embodiments thereof except as defined in the appended claims.

What is claimed is:

1. An interchangeable lens-type video camera system comprising a camera and an interchangeable lens assembly, said camera including:

image sensing means for converting an image of a subject to an image signal and outputting a picture represented by the image signal;
  pointing means for pointing to any position in the picture;
  first area setting means for setting a first focal-point detecting area at said any position pointed to by said pointing means;
  second area setting means for setting a second focal-point detecting area at a prescribed position in said picture;
  selecting means for selecting said first area setting means or said second area setting means;
  extracting means for extracting a prescribed signal component from an image signal contained in the first-mentioned image signal and corresponding to a focal-point detection area set by said first area setting means or second area setting means, whichever has been selected by said selecting means; and
  transmitting means for transmitting information relating to the focal-point detection area, information representing status of said first area setting means, an evaluation value and selection information from said selecting means to the lens assembly;
said lens assembly including:
  receiving means for receiving information relating to the focal-point detection area, information representing status of said first area setting means, the evaluation value and selection information from said camera;
  drive means for driving a lens possessed by said lens assembly; and
  control means for controlling said drive means based upon the information relating to the focal-point detection area, information representing status of said first area setting means, the evaluation value and selection information from said camera received by said receiving means.

2. The system according to claim 1, wherein said control means changes a control operation from status of focus of said lens in dependence upon the selection information.

3. The system according to claim 2, wherein said control means changes amount of drive of said lens in dependence upon the selection information when said lens is driven slightly for the purpose of judging focusing direction of said lens.

4. The system according to claim 1, wherein said pointing means points to said any position by detecting position of operator's line of sight directed into the picture.

5. A lens assembly capable of being attached to and detached from a camera for converting an image of a subject to an image signal and outputting a picture represented by the image signal, said lens assembly comprising:

drive means for driving a lens possessed by the lens assembly;
  receiving means for receiving the image signal and information relating to a set area in the picture from said camera;
  area setting means for setting a prescribed area in dependence upon the information relating to the set area received by said receiving means;
  extracting means for extracting a prescribed signal component from an image signal contained in the first-mentioned image signal receiving by said receiving means and corresponding to the prescribed area set by said area setting means, and generating an evaluation value relating to the imaged state of said picture; and
  control means for controlling said drive means in dependence upon the evaluation value generated by said extracting means.

6. The lens assembly according to claim 5, wherein said prescribed area is a focal-point detection area for detecting the focal point of said lens assembly, and the evaluation value relating to an imaged state represents state of focus of said lens assembly.

7. An interchangeable lens-type video camera system comprising a camera and an interchangeable lens assembly, said camera including:

image sensing means for converting an image of a subject to an image signal and outputting a picture represented by the image signal;

pointing means for pointing to any position in the picture; and transmitting means for transmitting an image signal outputted by said image sensing means and information relating to said any position pointed to by said pointing means to said lens assembly; and said lens assembly includes:

drive means for driving a lens possessed by the lens assembly;

receiving means for receiving the image signal and information relating to said any position in the picture from said camera;

area setting means for setting a prescribed area in dependence upon the information relating to said any position received by said receiving means;

extracting means for extracting a prescribed signal component from an image signal contained in the first-mentioned image signal receiving by said receiving means and corresponding to the prescribed area set by said area setting means, and generating an evaluation value relating to the imaged state of said picture; and control means for controlling said drive means in dependence upon the evaluation value generated by said extracting means.

8. The system according to claim 7, wherein said prescribed area is a focal-point detection area for detecting the focal point of said lens assembly, and the evaluation value relating to the imaged state represents state of focus of said lens assembly.

9. The system according to claim 7, wherein said pointing means points to said any position by detecting position of operator's line of sight directed into the picture.

10. The system according to claim 7, wherein said pointing means is a pointing device such as a keyboard, mouse, track ball or joystick.

11. The system according to claim 7, further comprising normalizing means for normalizing the image signal before the image signal is transmitted by said transmitting means.

12. An interchangeable lens-type video camera system comprising a camera and an interchangeable lens assembly, said camera including:

image sensing means for converting an image of a subject to an image signal and outputting a picture represented by the image signal;

pointing means for pointing to any position in the picture;

selecting means for selecting on/off of operation of said pointing means; and transmitting means for transmitting, to said lens assembly, an image signal outputted by said image sensing means and information relating to said any position in the picture pointed to by said pointing means when said pointing means is on or information relating to a predetermined prescribed position when said pointing means is off; and said lens assembly includes:

drive means for driving a lens possessed by said lens assembly;

receiving means for receiving the image signal, the information relating to said any position in the picture or information relating to the prescribed position from said camera;

area setting means for setting a focal-point detection area in dependence upon the information relating to said any position or information relating to the prescribed position received by said receiving means;

extracting means for extracting a prescribed signal component from an image signal contained in the first-mentioned image signal receiving by said receiving means and corresponding to the prescribed area set by said area setting means, and generating an evaluation value relating to the imaged state of said picture; and control means for controlling said drive means in dependence upon the evaluation value generated by said extracting means.

13. The system according to claim 12, wherein said pointing means points to said any position by detecting position of operator's line of sight directed into the picture.

* * * * *